United States Patent
Dubuisson-Jolly et al.

(10) Patent No.: US 6,195,445 B1
(45) Date of Patent: Feb. 27, 2001

(54) MOTION COMPENSATION OF AN IMAGE SEQUENCE USING OPTIMAL POLYLINE TRACKING

(75) Inventors: Marie-Pierre Dubuisson-Jolly, Hillsborough; Cheng-Chung Liang, Lawrenceville; Alok Gupta, East Brunswick, all of NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 08/948,117

(22) Filed: Oct. 9, 1997

Related U.S. Application Data

(63) Continuation-in-part of application No. 08/885,041, filed on Jun. 30, 1997.

(51) Int. Cl.⁷ .................................................... G06K 9/00
(52) U.S. Cl. .......................................... 382/107; 382/128
(58) Field of Search ..................................... 382/107, 128, 382/132, 190, 192, 199, 266; 378/98.2; 348/169

(56) References Cited

U.S. PATENT DOCUMENTS

| 5,054,045 |   | 10/1991 | Whiting et al. | 378/99 |
| 5,293,574 |   | 3/1994 | Roehm et al. | 378/98.2 |
| 5,559,551 | * | 9/1996 | Sakamoto et al. | 348/169 |
| 5,719,951 | * | 2/1998 | Shackleton et al. | 382/118 |
| 5,940,538 | * | 8/1999 | Spiegel et al. | 382/236 |

FOREIGN PATENT DOCUMENTS

| 404126473 | * | 4/1992 | (JP) | H04N/5/232 |
| 405300516 | * | 11/1993 | (JP) | H04N/7/18 |
| 406187449 | * | 7/1994 | (JP) | G06F/15/70 |

OTHER PUBLICATIONS

Ballard et al, "Computer Vision", *Prentice Hall,* Englewood Cliffs, NJ, 1982, pp. 137–145.

Brassard et al, "Algorithmics Theory and Practice", *Prentice Hall,* Englewood Cliffs, NJ, 1988, pp. 87–92.

Eigler et al, "Improving Detection of Coronary Morphologic Features from Digital Angiograms: Effect of Stenosis Stabilization Display", *Circulation,* vol. 89, pp. 2700–2709, 1994.

Geiger et al, "Dynamic Programming for Detecting, Tracking, and Matching Deformable Contours", *IEEE Transactions on Pattern Analysis and Machine Intelligence,* vol. 17, No. 3, Mar. 1995, pp. 294–302.

Kass et al, Snakes: Active Contour Models, *International Journal of Computer Vision,* vol. 2, 1988, pp. 321–331.

Koller et al, "Multiscale Detection of Curvilinear Structures in 2–D and 3–D Image Data", *1995 IEEE,* pp. 864–869.

Jain et al, "Algorithms for Clustering Data", *Prentice Hall,* Englewood Cliffs, NJ, 1988, pp. 89–92.

* cited by examiner

*Primary Examiner*—Jose L. Couso
*Assistant Examiner*—Anh Hong Do
(74) *Attorney, Agent, or Firm*—Donald B. Paschburg

(57) ABSTRACT

A technique of displaying a segment of a coronary artery in a stabilized cineangiogram. A computer system receives a sequence of images of a conventional cineangiogram. A user displays a first image on a monitor and selects a point on an arterial segment. The computer system invokes an image tracking procedure that employs active optimal polyline contours to locate the arterial segment and a fixed point in each of the image frames of the conventional cineangiogram. The computer system produces a stabilized cineangiogram by translating the images to place the arterial segment in substantially the same viewing location in each one of the image frames.

29 Claims, 28 Drawing Sheets

RIDGE MAGNITUDE

MOTION COMPENSATION OF AN IMAGE SEQUENCE USING OPTIMAL POLYLINE TRACKING

RELATED APPLICATION

This application is a continuation-in-part of U.S. patent application Ser. No. 08/885,041 filed on Jun. 30, 1997 entitled "Object Tracking Technique Using Polyline Contours.

BACKGROUND OF THE INVENTION

1. Field of the Invention

The invention relates to computer vision techniques and, more particularly, to apparatus and methods for automatically tracking objects contained in image sequences.

2. Description of the Prior Art

In the field of computer vision, active contours have been used to detect and track objects of interest in a sequence of digital images. Computer systems capable of tracking active contours have been successfully used to perform a variety of image processing tasks, such as deleting, enhancing, coloring, reshaping or otherwise modifying selected objects in digital images according to some predetermined criteria. Although contour tracking systems have served the purpose, they have not proved entirely reliable in many image processing applications where it is necessary to track complex, deformable and/or articulated objects.

For example, image tracking systems have found important applications in some medical diagnostic equipment. A need has long existed in the medical field for imaging systems which enhance selected portions of medical images, such as magnetic resonance images, digitally subtracted angiograms and computer tomography images. However, current diagnostic systems often have limited image tracking capabilities when processing medical images containing complex arrays of similar objects that are subject to rapid movements. Specifically, the medical community has long expressed a special need for more reliable techniques of automatically, or semi-automatically, detecting and displaying enhanced images of selected arteries in motion, e.g., the time evolution of the left and right ventricles, when diagnosing abnormalities of a human heart such as arterial stenosis. However, the relevant medical images normally contain, in addition to an artery of interest, an assortment of similarly shaped arteries, veins, and other vessels which move rapidly as the heart beats. To improve visualization of such medical image sequences, stabilizing techniques have been developed which track a user-selected point on an artery and digitally translate the image data such that the selected point remains motionless throughout the image sequence. Examples of point stabilizing techniques of this type may be found in the following documents: Eigler et al, "Improving detection of coronary morphologic features from digital angiograms: Effect of stenosis stabilization display," *Circulation*, Volume 89, pp. 2700–2709, 1994 (hereinafter the Eigler et al article); U.S. Pat. No. 5,054,045 entitled "Coronary Tracking Display," issued on Oct. 1, 1991 to Whiting et al (hereinafter the Whiting et al patent); and U.S. Pat. No. 5,293,574 entitled "Digital X-Ray Imaging System with Automatic Tracking," issued on Mar. 8, 1994 to Roehm et al (hereinafter referred to as the Roehm et al patent).

Active contour tracking essentially involves the process of segmenting a first image into separate regions and then tracking these regions through time from a sequence of similar images. Segmenting a digital image, which typically comprises an array of pixels, involves the process of identifying which pixel belongs to which region. Data is then generated which identifies sets of pixels that represent a contour that approximately outlines a distinct feature, such as an edge or a ridge, that defines the regions of interest. In many applications, the regions may be relatively uncomplicated and can be approximated with simple geometric shapes, such as circles, rectangles, ellipses, or others. However, since many natural objects cannot be described by simple geometric shapes, techniques have been developed to represent an edge or a ridge on these objects with more complex contours than those simple shapes. One important prior art technique for modeling complex shapes with active contours involves the use of "snakes." The following article describes a snake technique in detail: Kass et al, "Snakes : Active Contour Models," *International Journal of Computer Vision*, Vol. 2, pp 321–331, 1988.

In general, a snake is an energy-minimizing active contour that is guided by external constraint forces and influenced by image forces that pull it toward features of interest such as lines, ridges and edges of an object. A typical energy or cost function for a snake may contain terms that measure the smoothness of the contour and the amount of edge strength along the contour. The goal is to minimize this function to find an optimal contour which is smooth and coincides with high-gradient magnitude points in the image. The Kass et al article proposes to minimize an energy or cost function using Euler equations and gradient descent.

A disadvantage of most snake techniques is that they can be very dependent on the starting points of the contour. The energy or cost minimization processes in snake techniques are usually based solely on gradient descent and are not guaranteed to locate a global minimum of the corresponding function. As a result, neighboring edges can be very distracting to such a process. Hence, depending on the initial contour configuration, different local minima of the corresponding function may be reached, thereby failing to find the optimal contour.

Another image tracking technique involves the use of "level sets", which have been used to model moving boundaries between two regions in physical phenomenon, such as an interface between ice and water at the polar regions, or an interface between fire and grass in a brush fire. In such situations, it is difficult to model the evolution of the contour and prevent the contour from crossing over itself. The level set approach builds an original curve into a surface called a "level set function". Then, instead of moving the curve, the level set function expands, rises and falls. The advantage of this technique is that the level set function is very well behaved; thus, topological changes which break the curve or merge two different curves are handled naturally. Also, this method extends very easily in three dimensions to model moving surface interfaces.

Unfortunately, the level set technique is primarily designed for tracking homogeneous objects. Also, it has been recognized that this technique requires symmetric initialization in the sense that if the initial contour is placed close to part of an object boundary, the contour can cross over that portion before reaching the other portions of the object boundary. In addition, if there are gaps in the object boundary, the level set will pass through the gaps without capturing the object of interest. In level set models, the contour usually slows down around image edges, but it does not come to a complete stop unless the edge is an ideal edge. For real edges, therefore, the contour has to be stopped in an ad-hoc manner.

A popular solution for locating the global optimum of a cost function involves a searching procedure that uses a graph exploration technique. Prior art graph exploration techniques have been primarily applied to extracting objects in a single image. Since it is difficult to model the shape of an object for tracking purposes, graph exploration techniques for contour extraction have had very limited success in tracking applications. Consequently, a need exists for image tracking systems capable of locating the global optimum of a cost function that combines shape and image information for a well defined active contour in an image sequence.

SUMMARY OF THE INVENTION

The present invention satisfies this need by providing an image tracking system, comprising an image sensor and an image processor, for acquiring a sequence of images and for generating digital image data related to light intensity at pixels having coordinates i and j of each of the images. A computer connects to the image sensor and image processor and stores and processes the digital image data to track an object of interest in the sequence of images. The computer comprises an input contour device for defining an input contour (in terms of pixel coordinates i and j) outlining an image characteristic of the object of interest in a first one of the images. The computer also comprises an optimal contour device for processing the digital image data of the images in sequence by performing, for each of the images, a graph exploration procedure to search a predefined search space related to the input contour to find a corresponding optimal contour outlining the object of interest. The computer further comprises an image tracker for storing the optimal contours (again in terms of pixel coordinates i and j) corresponding to the sequence of images.

Another aspect of the invention includes an image tracking system comprising an image device for acquiring a sequence of images, converting the images into digital image data related to the light intensity at the pixels of each image, and generating the digital image data. A computer connects to the image device for storing and processing the digital image data to track an object of interest in the sequence of images. The computer then forms an initial contour substantially outlining an image characteristic of the object of interest in a first one of the images. The computer forms input contours for each of the images subsequent to the first ore of the images. Each of the input contours substantially outline the image characteristic in corresponding ones of each image. The computer processes the digital image data of the images in sequence by performing, for each image, a graph exploration procedure that starts with the initial contour in the first one of the images and with a corresponding one of the input contours in the images subsequent to the first one of the images, to search different contours in a predefined search space to find a corresponding optimal contour outlining the object of interest in each image. An image tracker forms a set of the optimal contours outlining the image characteristic of the object of interest in the sequence of images and stores the pixel coordinates of the set of optimal contours.

Still, another aspect of the invention includes a method of tracking an object of interest in a sequence of images comprising the steps of: acquiring a sequence of images; converting the sequence of images into digital image data related to the light intensity at the pixels of each image; storing the digital image data; forming an initial contour substantially outlining an image characteristic of the object of interest in a first one of the images; forming input contours for each of the images subsequent to the first one of the images, each input contour substantially outlining the image characteristic in corresponding ones of each image; processing the digital image data of the images in sequence by performing, for each image, a graph exploration procedure, starting with the initial contour in the first one of the images and with a corresponding one of the input contours in the images subsequent to the first one of the images; searching different contours in a predefined search space to find a corresponding optimal contour outlining the object of interest in each image; forming a set of the optimal contours outlining the image characteristic of the object of interest in the sequence of images; and finally storing the pixel coordinates of the set of optimal contours.

A more specific aspect of the invention includes a technique of tracking an object in a sequence of images using active polyline contours. An imaging apparatus converts a sequence of images into digital image data related to the light intensity at the pixels of each image. A computer stores the digital image data and forms an initial polyline that substantially outlines an edge of the object in a first image. The computer forms input polylines for each of the subsequent images which substantially outline the edge in the corresponding image and are derived from the optimal polyline of the previous image. The computer processes the digital image data, performing a graph exploration procedure that starts with the initial polyline in the first image and the input polylines in the subsequent images. The graph exploration procedure searches polylines in a predefined search space to find the corresponding optimal polylines. The computer assigns groups of pixels enveloping vertices of the initial and input polylines to form the predefined search space for each image. The computer evaluates an edge strength of the different polylines with respect to the light intensity of its underlying pixels to obtain corresponding contour costs. The computer evaluates the contour cost by calculating an image cost that is a function of the gradient magnitude and gradient direction of the image intensity. The computer further evaluates the contour cost by calculating a deformation cost that is a function of a stretching cost and a bending cost for the different polylines with respect to preceding ones of the images. The polyline with a smallest contour cost is selected as the optimal contour for each of the images. The set of optimal contours are used to track the object of interest.

A further aspect of the invention includes a method of displaying a segment of a coronary artery in a cineangiogram. The method involves digitizing cineangiogram image frames and locating an arterial segment in the image frames using active optimal polyline contours. The image frames are digitally shifted to place the arterial segment in substantially the same viewing location in each one of the image frames.

Yet, a further aspect of the invention includes a technique of producing a stabilized display of a sequence of digital images formed from an array of pixels. The display is stabilized about a fixed point in the sequence of images. A user displays one of the images of the sequence of images and selects a point from the displayed image. The user-selected point is located on a moving object having a one-dimensional feature. An initial polyline contour, extracted from the displayed image, outlines the one-dimensional feature in the neighborhood of the user-selected point. An optimal polyline contour corresponding to the initial polyline contour is recovered from each of the other images of the sequence of images. A fixed point is located adjacent the user-selected point on the initial polyline contour. The fixed point is also located on each of the optimal polyline contours. The stabilized display is formed by digitally translating the position of each of the other images such that the fixed point appears substantially motionless in the stabilized display.

BRIEF DESCRIPTION OF THE DRAWINGS

The teachings of the present invention can be readily understood by considering the following detailed description in conjunction with the accompanying drawings, in which.

To facilitate reader understanding, identical reference characters have been used to denote those elements that are common to various figures.

DETAILED DESCRIPTION OF THE PREFERRED EMBODIMENT

Figure 1:
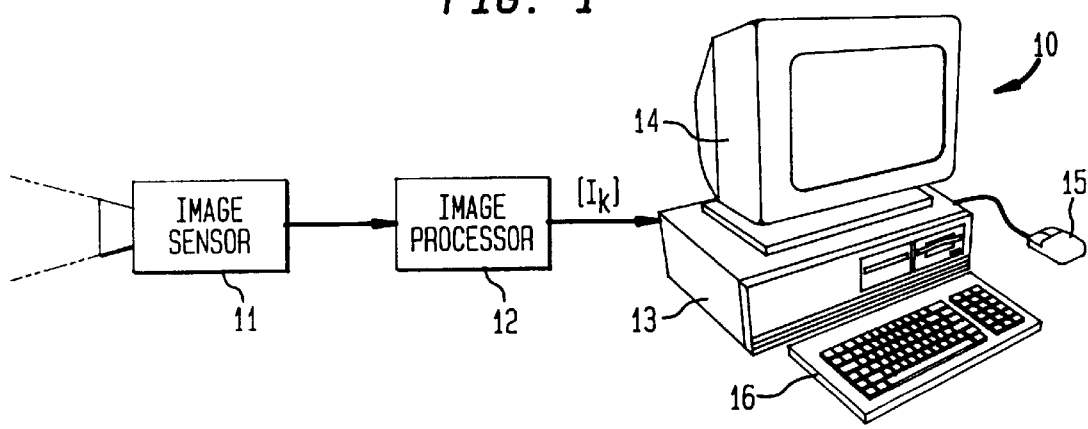
FIG. 1 is a block diagram of a computer vision system for performing image tracking using polyline contours in accordance with the present invention.
Figure 2A:
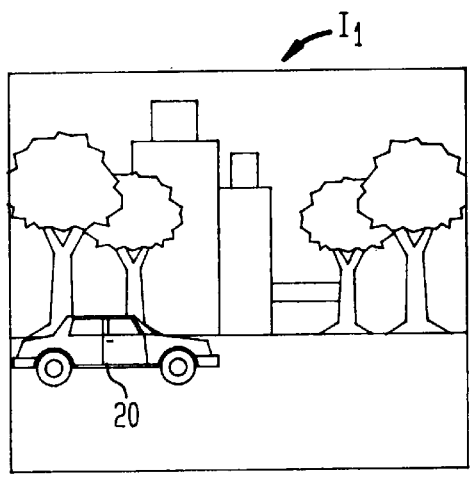
FIGS. 2A–2D represent a digital image sequence of four images in which an automobile moves from left to right across the image sequence.
Figure 2B:
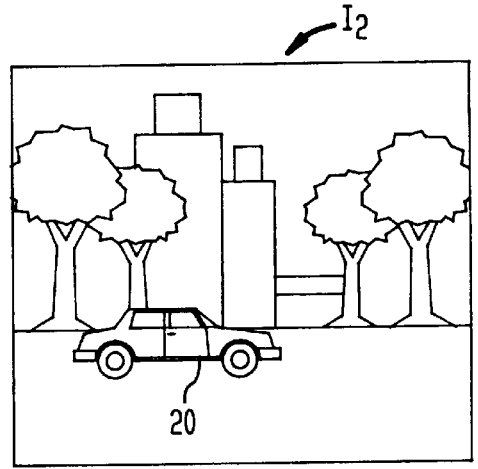
Figure 2C:
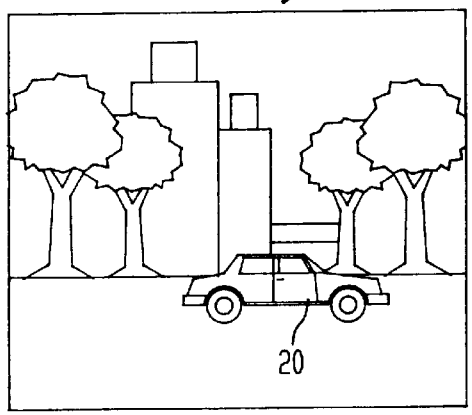
Figure 2D:
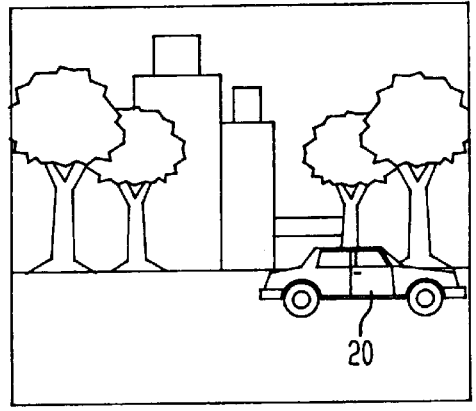

Referring now to the drawings, FIG. 1 illustrates computer vision system 10 which acquires, interprets and processes visual information captured by image sensor 11. Image sensor 11, which may be a television camera, an X-ray tube, an infrared image sensor, or other conventional image sensing device, transmits analog video signals to image processor 12. In response, image processor 12 outputs image sequence $[I_k]$, k=1, 2, . . . , K, with each digital image $I_k(i,j)$ formatted as digitized gray-scale data. As such, each digital image $I_k(i,j)$ comprises a set of pixels arranged in a rectangular array of rows (i) and columns (j), with each such pixel having a gray-scale value representing light intensity, I, at that pixel. For instance, conventional digital images often contain a 512-by-512-pixel display coded in an 8-bit format to provide 256 different possible levels of intensity I per pixel. Image processor 12 transmits the gray-scale image data to computer 13 for further processing including tracking preselected objects of interest in digital image sequence $[I_k]$. FIGS. 2A–2D depict an illustrative image sequence containing four digitized gray-scale images identified respectively as images $I_1$–$I_4$ (most practical applications would involve a substantially greater number of images). A user interacts with computer 13 via monitor 14, mouse 15 and keyboard 16.

Figure 3:
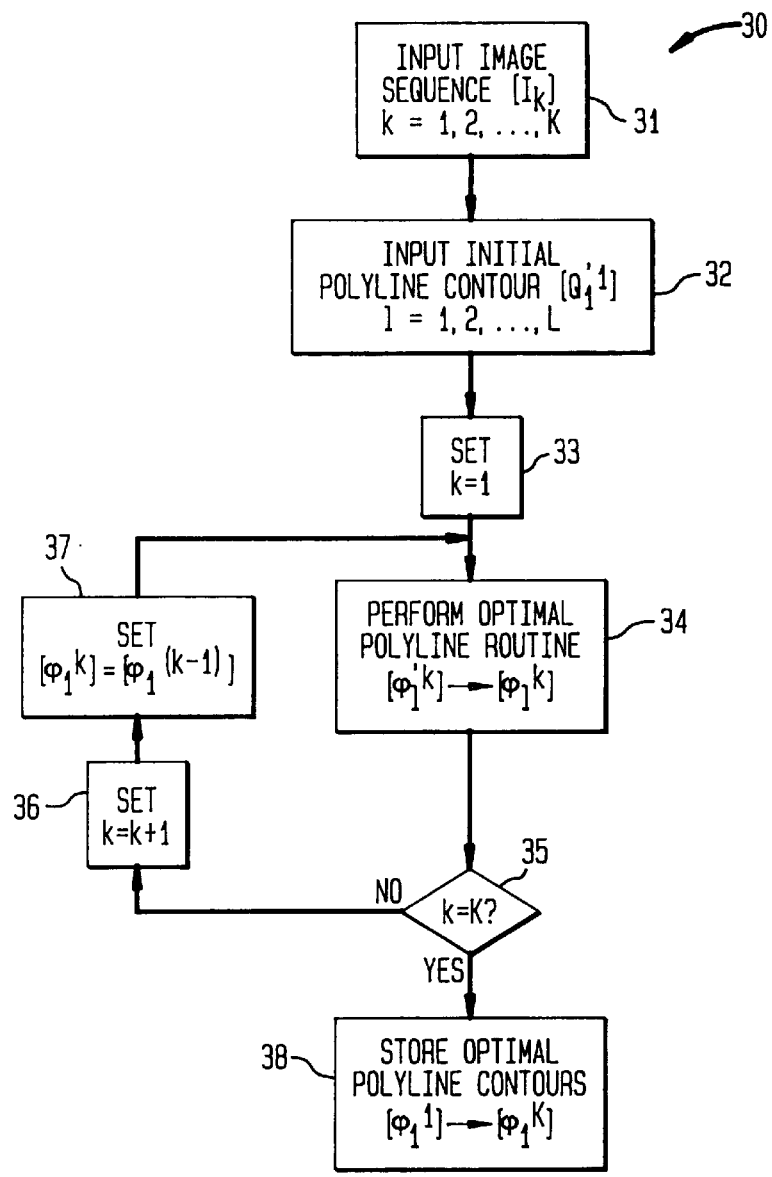
FIG. 3 is a high-level flow chart illustrating an image tracking process of the present invention.

FIG. 3 depicts a high-level flow diagram of image tracking process 30, which computer 13 executes when tracking a designated object of interest in image sequence $[I_k]$. For example, a user may wish to track automobile 20 as it moves from left to right, starting with image $I_1$ of FIG. 2A and ending with image $I_4$ of FIG. 2D. In that regard, the user may wish to track the automobile for purposes of producing a modified image sequence with the automobile deleted from the images, or enhanced to make the automobile more noticeable than otherwise. Other applications of image tracking process 30 will become evident from the following description. To simplify understanding, the reader should simultaneously refer to FIGS. 2–4 throughout the following discussion.

Figure 4:
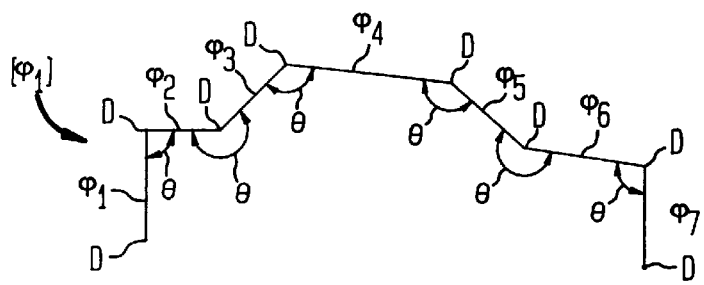
FIG. 4 is an active polyline contour for use in tracking objects of interest in accordance with the image tracking process of FIG. 3.

Image tracking process 30 models an object being tracked in image sequence $[I_k]$ with active polyline contours $[\phi_l^k]$, where l=1, 2, . . . , L. In general, a polyline comprises a series of straight lines, called line segments, joined at their ends to usually form an open polygon. Polyline contour $[\phi_l]$, where l=1, 2, . . . , L, comprises a polyline having a series of line segments that together outline an object of interest in an image. The specific polyline contour $[\phi_l]$ depicted in FIG. 4 comprises seven line segments, $\phi_1$–$\phi_7$, illustratively shown in outine form of automobile 20. Polyline contour $[\phi_l]$ is said to have vertices D, which are located at the end points and intersections of line segments $\phi_1$–$\phi_7$. Additionally, FIG. 4 shows line segments $\phi_1$–$\phi_7$ forming angles, generally depicted as θ, at their intersections. The shape, size and location of active polyline contour $[\phi_l^k]$ in digital image $I_k(i,j)$ may be completely specified by the pixel coordinates (i,j) of vertices D.

The goal of image tracking process 30 is to start with initial polyline contour $[\phi'_l^1]$ (the prime symbol is used to designate that an item is an input) from first image $I_1$ and then locate a corresponding optimal polyline contour $[\phi_I^k]$ in each of the following images $I_k$, knowing that the object shape might not be exactly the same in each image, since a two-dimensional polyline contour is usually a projection of a three-dimensional object in the scene and since the image is digitized. Additionally, in many cases the object being tracked is deformable and/or contains articulated parts, which may further cause the physical dimensions of the object to change from image-to-image.

Image tracking process 30 of FIG. 3 begins with successive input STEPS 31 and 32. Image processor 12 performs input STEP 31 when applying image sequence $[I_k]$ to computer 13 as described above with respect to FIG. 1. Next, a user performs input STEP 32 by selecting an object to be tracked in image sequence $[I_k]$. Specifically, in STEP 32, the user causes computer 13 to display first image $I_1$ of stored image sequence $[I_k]$ on monitor 14. The user then designates an object to be tracked by constructing initial polyline contour $[\phi'_I{}^1]$ for first image $I_1$ on monitor 14. When constructing initial polyline contour $[\phi'_I{}^1]$, the user essentially outlines a prominent feature of the object, such as a sharp edge or a ridge on the object, which, in the judgment of the user, can be used to track the object of interest. The user may construct initial polyline contour $[\phi'_I{}^1]$ by using mouse 15 and/or keyboard 16 to visually select corresponding input vertices D' of first image $I_1$ on monitor 14. For example, a user may display image $I_1$ of FIG. 2A on monitor 14 and then manually select vertices D' by pointing and clicking mouse 15 at the corners of automobile 20. In response, computer 13 saves the set of pixel coordinates (i,j) of input vertices D'. Then, using initial polyline contour $[\phi'_I{}^1]$ as a starting point, image tracking process 30 invokes STEPS 33–37 to automatically track the selected object (automobile 20) in image sequence $[I_k]$.

In STEP 33, computer 13 sets image index k to a value one. This causes image tracking process 30 to process first image $I_1$ in STEP 34. With k equal to one in STEP 34, computer 13 performs an optimal polyline routine using initial polyline contour $[\phi'_I{}^1]$ as a starting point to search for optimal polyline contour $[\phi_I{}^1]$ in first image $I_1$. FIGS. 5–8 show the details of the optimal polyline routine of STEP 34. In general, the optimal polyline routine of STEP 34 employs a graph exploration procedure (see search STEP 44 shown in FIG. 5 and detailed in FIG. 7) that searches predefined search spaces SS to find optimal polyline contour $[\phi_I{}^k]$ corresponding to input polyline contour $[\phi'_I{}^k]$.

After performing the optimal polyline routine for first image $I_1$ in STEP 34 shown in FIG. 3, image tracking process 30 proceeds to decision STEP 35 where the value of index k is examined. If, in STEP 35, k was determined to equal K, meaning that STEP 34 has processed all images in image sequence $[I_k]$, image tracking process 30 proceeds, via yes path (Y) of decision STEP 35, to store STEP 38. Consequently, after finding optimal polyline contour $[\phi_I{}^k]$ during successive iterations of STEP 34, computer 13 saves a complete set of optimal polyline contours $[\phi_I{}^1]$–$[\phi_I{}^k]$ for all images in image sequence $[I_k]$ in store STEP 38 by storing pixel coordinates (i,j) for vertices D of each optimal polyline contour $[\phi_I{}^k]$.

However, if k does not equal K in decision STEP 35, image tracking process 30 exits STEP 35 via its no path (N) and invokes set STEP 36, incrementing k to a value of k+1. Next, computer 13 invokes set STEP 37, setting input polyline contour $[\phi'_I{}^k]$ equal to optimal polyline contour $[\phi_I{}^{(k-1)}]$, which the optimal polyline routine will use in STEP 34. In other words, when processing an image in STEP 34, image tracking process 30 starts either with initial polyline contour $[\phi'_I{}^1]$, for the first iteration of STEP 34, or with the optimal polyline contour that was found when processing the previous image. Image tracking process 30 continues to perform STEPS 34–37 in seriatim until such time that last image $I_K$ has been processed in STEP 34. For each optimal polyline contour $[\phi_I{}^k]$ found in STEP 34, computer 13 stores image tracking data. Specifically, after finding optimal polyline contour $[\phi_I{}^k]$ for each image $I_k$, computer 13 saves the set of optimal polyline contours $[\phi_I{}^1]$–$[\phi_I{}^k]$, in store STEP 38, as a set of pixel coordinates (i,j) of the corresponding vertices D, and the corresponding image number k.

Figure 5:
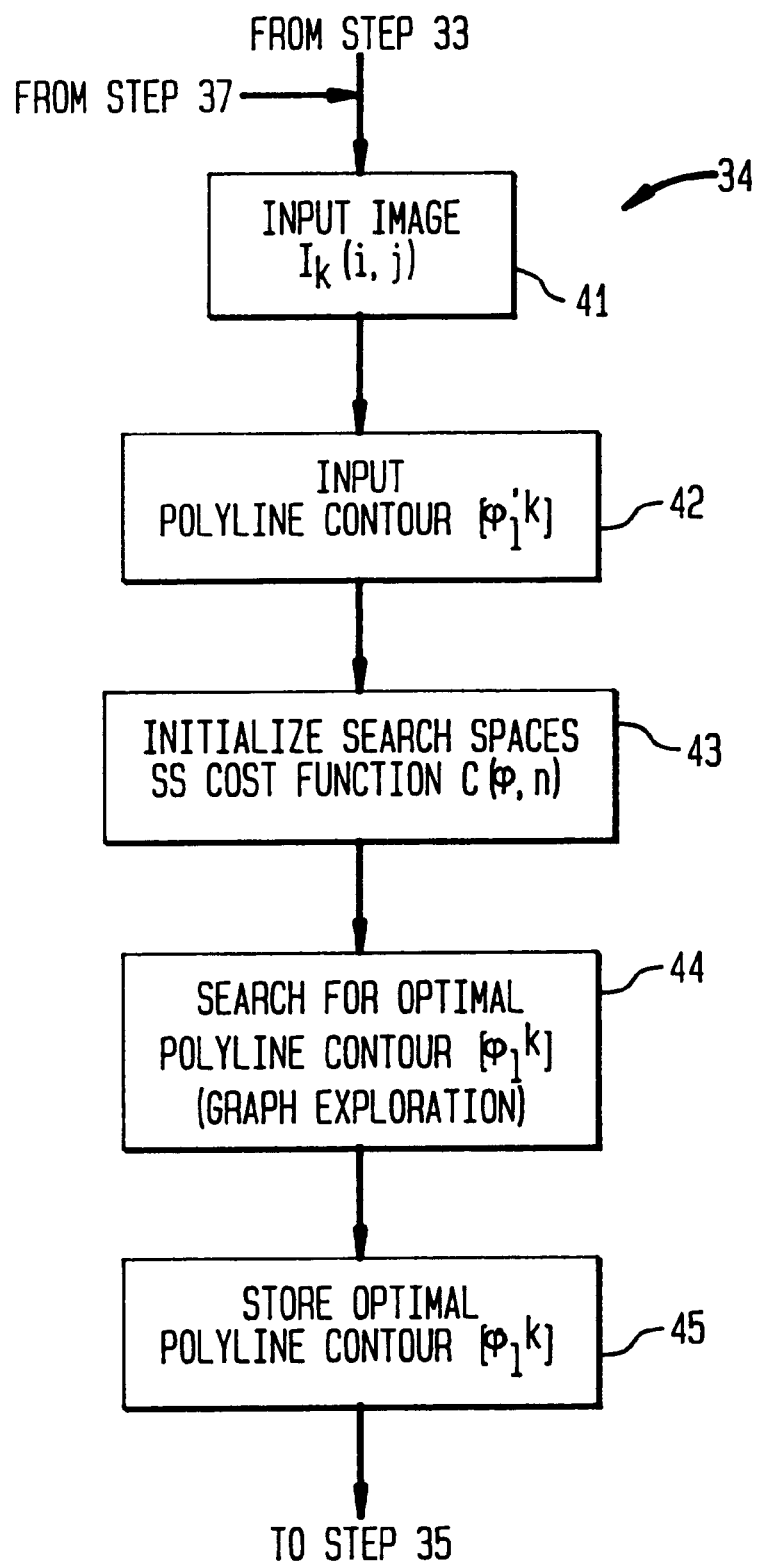
FIG. 5 is a high-level flow chart illustrating an optimal polyline routine which forms a part of the image tracking process of FIG. 3.

With reference to FIG. 5, the optimal polyline routine of STEP 34 begins with successive input STEPS 41 and 42. In input STEP 41, computer 13 selects and obtains a specific digital image $I_k(i,j)$ for processing. Next, in input STEP 42, computer 13 obtains a corresponding input polyline contour $[\phi'_I{}^k]$, which image tracking process 30 has selected in accordance with STEPS 32 or 37 as described above.

Computer 13 next initializes, in STEP 43, a set of search spaces SS(1)–SS(L+1) and polyline cost function $C(\phi,n)$, where n is a group index for line segments $\phi$ in a polyline. The initialized search spaces SS(1)–SS(L+1) and polyline cost function $C(\phi,n)$ are used in search STEP 44 to search for optimal polyline contour $[\phi_I{}^k]$. As indicated in FIG. 5, search STEP 44 involves the use of a graph exploration procedure that is described in detail with respect to FIGS. 7 and 8. Thus, computer 13 performs search STEP 44, shown in FIG. 5, using digital image $I_k(i,j)$ and corresponding input polyline contour $[\phi'_I{}^k]$ that were input in respective input STEP 41 and 42. Computer 13 also uses search spaces SS(1)–SS(L+1) and polyline cost functions $C(\phi,n)$ that were initialized in STEP 43. Computer 13 saves each optimal polyline contour $[\phi_I{}^k]$ in store STEP 45 and then returns to decision STEP 35 of FIG. 3.

Figure 6:
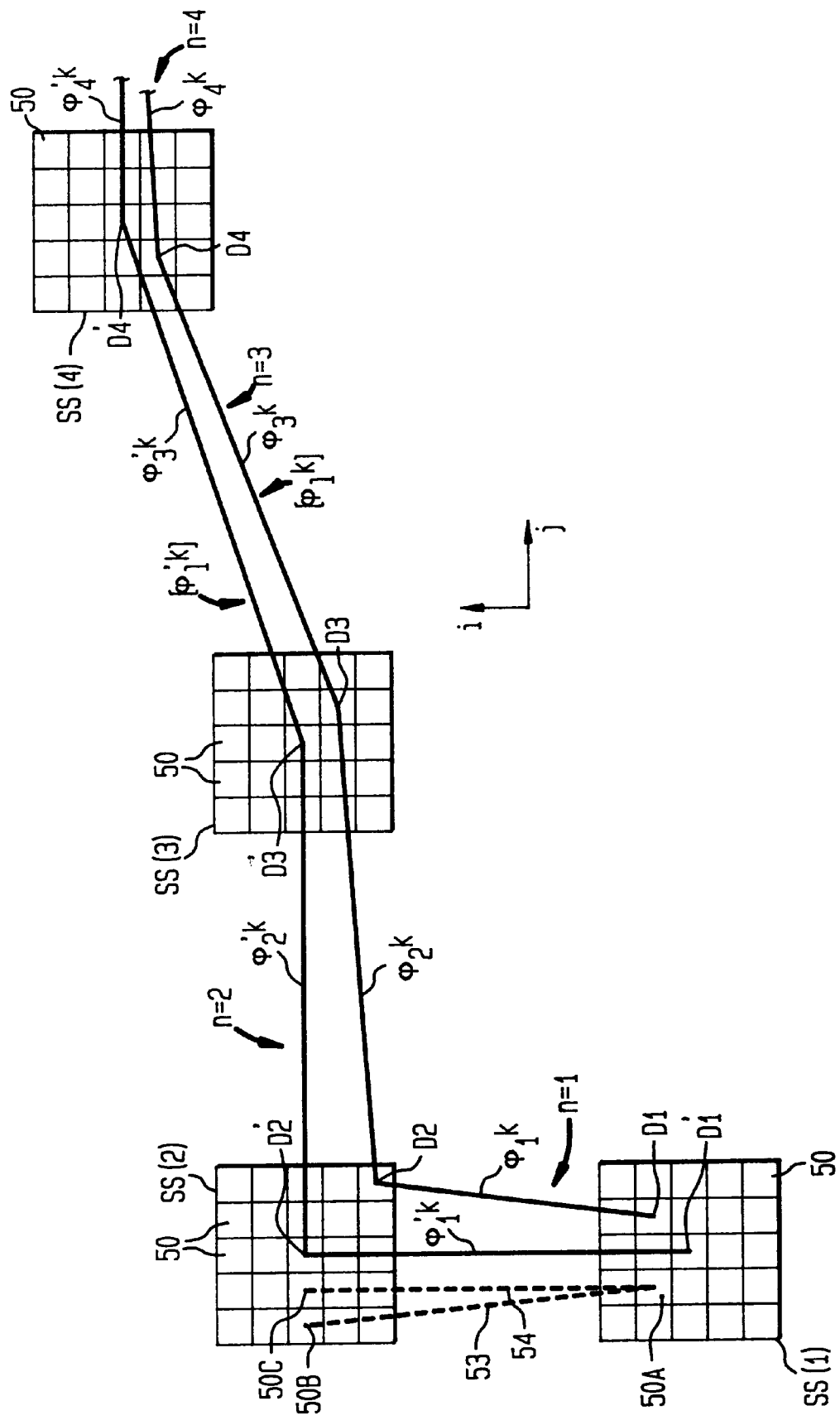
FIG. 6 is a polyline corresponding to a portion of the polyline contour shown in FIG. 4.

FIG. 6 shows an enlarged polyline which corresponds to a portion of the polyline contour shown in FIG. 4. Specifically, FIG. 6 illustrates a first polyline made up of input line segments $\phi'_1{}^k$, $\phi'_2{}^k$, $\phi'_3{}^k$ and $\phi'_4{}^k$ which correspond respectively to line segments $\phi_1$, $\phi_2$, $\phi_3$ and $\phi_4$ shown in FIG. 4 for automobile 20 of FIGS. 2A–2D. In the FIG. 6 illustration, line segments $\phi'_1{}^k$, $\phi'_2{}^k$, $\phi'_3{}^k$ and $\phi'_4{}^k$ represent the first four line segments of an input polyline contour $[\phi'_I{}^k]$ of the type output by STEPS 32 and 37 in image tracking process 30 of FIG. 3. Further, FIG. 6 also illustrates a second polyline corresponding to line segments $\phi_1{}^k$, $\phi_2{}^k$, $\phi_3{}^k$ and $\phi_4{}^k$, which make up the desired optimal polyline contour $[\phi_I{}^k]$ being searched for and generated as output by search STEP 44.

In initialize STEP 43 of FIG. 5, computer 13 constructs a search space for each input vertex D' of input polyline contour $[\phi'_I{}^k]$. FIG. 6 illustrates four such search spaces SS(1)–SS(4), which computer 13 constructed by assigning four groups of pixels 50 in square arrays to surround input vertices D1'–D4'. It is noted that FIG. 6 shows only those pixels 50 that have been assigned to search spaces SS(1)–SS(4); pixels associated with the remainder of the image have been omitted for clarity.

Search spaces SS(1)–SS(L+1) are each centered about its corresponding vertex D. For instance, search space SS(1) comprises a 5-by-5 pixel array for a total of 25 pixels 50 with vertex D1' located at the center of the array. Computer 13 centers search spaces SS(2)–SS(4) in a similar manner with respect to the corresponding input vertices D2'–D4'.

In addition to establishing search spaces in initialize STEP 43, computer 13 also initalizes polyline cost functions C($\phi$,n). Polyline cost functions C($\phi$,n) comprise mathematical relationships made up of cost components primarily related to the specific image features selected by the user. As indicated above, active polyline contours may be used to track image features such as an edge, a ridge, a texture, or similar characteristic.

In the case of edge tracking, polyline cost function C($\phi$,n) essentially includes two components of cost, namely, an image cost and a deformation cost. The image cost combines edge magnitude and edge direction information for a particular line segment with respect to an edge in an image. The deformation cost combines stretching and bending information with respect to successive images. The image cost $e_1(\phi)$ for one line segment is defined as follows:

$$e_1(\varphi) = \frac{1}{U(\varphi) + \varepsilon} \quad (1)$$

where:

$$U(\varphi) = \frac{\sum_{(i,j)\in\varphi} \left[\|\nabla I\|(i,j) h\left(\vec{\varphi} \cdot \vec{\nabla} I(i,j)\right)\right]}{\sum_{(i,j)\in\varphi} 1}; \quad (2)$$

$\epsilon$ is an arbitrarily small positive number that is added to U($\phi$) to prevent the denominator of Equation (1) from being zero;

$\|\nabla I\|(i,j)$ is the gradient magnitude of I, i.e., $$\|\nabla I\|(i,j) = \left[\left(\frac{\partial I}{\partial i}\right)^2 + \left(\frac{\partial I}{\partial j}\right)^2\right]^{1/2}; \quad (3)$$

$\vec{\varphi}$ is a unit vector in the direction of $\phi$;

$\vec{\nabla}I(i,j)$ is a unit vector of the gradient direction of I such that $$\vec{\nabla} I(i,j) = \tan^{-1}\left(\frac{\frac{\partial I}{\partial j}}{\frac{\partial I}{\partial i}}\right); \text{ and} \quad (4)$$

$$h(x) = \begin{cases} 1 - |x| & -1 \le x \le 1 \\ 0 & \text{elsewhere} \end{cases} \quad (5)$$

where: $x = \left(\vec{\varphi} \cdot \vec{\nabla} I(i,j)\right).$ (6)

Image cost $e_1(\phi)$ essentially evaluates edge strength of line segment $\phi$ with respect to its underlying pixels 50. The first term in the summation in the numerator of Equation (2), $\|\nabla I\|(i,j)$, represents the magnitude of the illumination gradient at an underlying pixel 50 having coordinates (i,j), while the second term, $h(\vec{\varphi} \cdot \vec{\nabla}I(i,j))$, represents function h(x), where x is a dot product of unit vector $\vec{\varphi}$ with unit vector $\vec{\nabla}I(i,j)$. Function h(x), which is defined in equation (5), equals one whenever the dot product x equals zero, which occurs when the direction of the illumination gradient is perpendicular to line segment $\phi$. The sum in the denominator of equation (2) represents the total number of underlying pixels 50, i.e., the number of pixels 50 that coincide with line segment $\phi$ and, therefore, are involved in the summations.

Consequently, as seen from Equation (2), U ($\phi$) will tend to be larger the closer that the illumination gradient $\vec{\nabla}I$ is to being perpendicular to line segment $\phi$ and the closer line segment $\phi$ is to pixels with high gradient magnitude. Equation (1) shows that as U ($\phi$) increases, image cost $e_1(\phi)$ decreases. Thus, small values of image cost $e_1(\phi)$ will indicate that the corresponding line segment $\phi$ coincides with underlying pixels 50 that have a strong edge response and have a local linear structure direction that is aligned with that line segment $\phi$.

As discussed above, the deformation cost introduces penalties for stretching and bending of a polyline between two successive images. A penalty for stretching is introduced by stretching cost $e_2(\phi', \phi)$, which compares the amount of stretch between line segment $\phi$ and the corresponding input line segment $\phi'$. The stretching cost is defined as follows:

$$e_2(\varphi', \varphi) = \frac{(\|\varphi\| - \|\varphi'\|)^2}{\|\varphi\| + \|\varphi'\|}; \quad (7)$$

where:

$\|\phi\|$ is the length of line segment $\phi$; and $\|\phi'\|$ is the length of input line segment $\phi'$.

A penalty for changing angle $\theta$ at vertex D of a polyline is introduced by bending cost $e_3(\phi'_l, \phi'_{(l+1)}, \phi_l, \phi_{(l+1)})$, which compares the amount of bending between successive line segments $\phi_l$ and $\phi_{(l+1)}$, and the corresponding input line segments $\phi'_l$ and $\phi'_{(l+1)}$. The bending cost associated with segment $\phi_{(l+1)}$ is defined as follows:

$$e_3(\varphi'_l, \varphi'_{(l+1)}, \varphi_l, \varphi_{(l+1)}) = \frac{[\theta(\varphi_l, \varphi_{(l+1)}) - \theta'(\varphi'_l, \varphi'_{(l+1)})]^2}{\theta(\varphi_l, \varphi_{(l+1)}) + \theta'(\varphi'_l, \varphi'_{(l+1)})} \quad (8)$$

where:

$\theta(\phi_l, \phi_{(l+1)})$ is the angle between successive line segments $\phi_l$ and $\phi_{(l+1)}$; and $\theta'(\phi'_l, \phi'_{(l+1)})$ is the angle between successive input line segments $\phi'_l$ and $\phi'_{(l+1)}$.

Consequently, the total polyline cost of line segment $\phi_{(l+1)}$ connected to line segment $\phi_l$ with respect to corresponding input line segments $\phi'_{(l+1)}$ and $\phi'_l$ is:

$$e(\varphi'_l, \varphi'_{(l+1)}, \varphi_l, \varphi_{(l+1)}) = e_1(\varphi_{(l+1)}) + \alpha e_2(\varphi'_{(l+1)}, \varphi_{(l+1)}) + \beta e_3(\varphi'_l, \varphi'_{(l+1)}, \varphi_l, \varphi_{(l+1)}). \quad (9)$$

The total cost C($\phi$,n) of a polyline extending from search space SS(1) to search space SS(n+1) may be expressed as follows:

$$C(\varphi, n) = \sum_{l=1}^{n} e_1(\varphi_l) + \alpha \sum_{l=1}^{n} e_2(\varphi'_l, \varphi_l) + \beta \sum_{l=2}^{n} e_3(\varphi'_{l-1}, \varphi'_l, \varphi_{(l-1)}, \varphi_l), \quad (10)$$

which is equivalent to:

-continued $$c(\varphi, n) = \sum_{l=1}^{n-1} e_1(\varphi_l) + e_1(\varphi_n) + \alpha \sum_{l=1}^{n-1} e_2(\varphi'_l, \varphi_l) + \quad (10a)$$

$$\alpha e_2(\varphi'_n, \varphi_n) + \beta \sum_{l=2}^{n-1} e_3(\varphi'_{l-1}, \varphi'_l, \varphi_{l-1}, \varphi_l) +$$

$$\beta e_3(\varphi'_{n-1}, \varphi'_n, \varphi_{n-1}, \varphi_n)$$

which is equivalent to:

$$c(\varphi, n) = c(\varphi, n-1) + e_1(\varphi_n) + \alpha e_2(\varphi'_n, \varphi_n) + \quad (10b)$$

$$\beta e_3(\varphi'_{n-1}, \varphi'_n, \varphi_{n-1}, \varphi_n).$$

For a polyline contour $[\phi_l]$, having L line segments $\phi$, with respect to corresponding input polyline contour $[\phi'_l]$, the total cost $C(\phi,L)$ is:

$$C(\varphi, L) = \sum_{l=1}^{L} e_1(\varphi_l) + \alpha \sum_{l=1}^{L} e_2(\varphi'_l, \varphi_l) + \quad (11)$$

$$\beta \sum_{l=2}^{L} e_3(\varphi'_{l-1}, \varphi'_l, \varphi_{(l-1)}, \varphi_l).$$

The factors $\alpha$ and $\beta$ in Equations (9, 10 and 11) are weighting factors which a user assigns values depending on the nature of the object being tracked. For instance, in the case of images $I_1$–$I_4$ shown in FIGS. 2A–2D, the edge lengths of automobile 20 and the angles between these edges would be expected to change somewhat while automobile 20 banks and turns as it moves across images $I_1$–$I_4$, since the images are two-dimensional projections of a moving three-dimensional object. Consequently, when tracking automobile 20, the user would assign appropriate values to factors $\alpha$ and $\beta$ (typically in the order of 100 to 200), to account for the degree of expected changes. In contrast, consider the case of tracking objects appearing in an image sequence taken from a satellite, e.g., tracking a highway or a river photographed from an orbiting satellite. In that case, the user would expect that the shapes of the highway and river edges would change very little, if at all, in successive images, in as much as these objects are not moving and are being photographed from a great distance. Consequently, the user would assign significantly higher values to weighting factors $\alpha$ and $\beta$ (e.g., in the order of 1000), thereby imposing a greater deformation penalty cost. For articulating and/or deformable objects, such as the silhouette of a runner, the user would assign significantly lower values to weighting factors $\alpha$ and $\beta$ (in the order of 10), thereby imposing a smaller deformation penalty cost.

The deformation penalties were chosen by comparing a polyline and its component line segments $\phi$ to a flexed version of an average relaxed spring. The stretching penalty described above compares with the energy associated with stretching or compressing a conventional spring. The bending penalty relates to the stiffness of a conventional spring, which is usually assumed to be inversely proportional to its length.

The graph exploration procedure, which computer 13 executes in search STEP 44 of FIG. 5, will now be described in detail while referring in particular to FIGS. 6 and 7. The goal of search STEP 44 is to find optimal polyline contour $[\phi_l^k]$ in each image $I_k$. Optimal polyline contour $[\phi_l^k]$ is defined as that polyline contour in image $I_k$ whose total cost $C(\phi,L)$ (see Equation (11)) is minimized with respect to all possible polyline contours within search spaces $SS(1)$–$SS(L+1)$. Illustratively, FIG. 6 contains portions of two of the possible polyline contours in search spaces $SS(1)$–$SS(L+1)$, namely, input polyline contour $[\phi'^k_l]$ and optimal polyline contour $[\phi_l^k]$. There are, of course, a significant number of additional polyline contours that may be drawn through search spaces $SS(1)$–$SS(L+1)$. Making an exhaustive search of all possible polyline contours within search spaces $SS(1)$–$SS(L+1)$ to find which one is the optimal polyline contour $[\phi_l^k]$, i.e., the one with the smallest total cost $C(\phi,L)$, is generally impractical because the total number of possible polyline contours within search spaces $SS(1)$–$SS(L+1)$ is normally quite large.

For example, if each search space contains N pixels, the total number of possible line segments $\phi$ that can extend between two successive search spaces equals $N^2$. Illustratively, in addition to line segments $[\phi'^k_1]$ and $[\phi_1^k]$, FIG. 6 shows two other possible line segments 53 and 54 extending between search spaces $SS(1)$–$SS(2)$. Line segments 53 and 54 extend from a common pixel 50A in search space $SS(1)$ to two different pixels 50B and 50C in search space $SS2$. All told, there will be $25^2=625$ different line segments $\phi$ that can be extended between search spaces $SS(1)$ and $SS(2)$ of FIG. 6. Further, when each search space contains N pixels and the polyline contour contains L line segments $\phi$, the total number of line segments $\phi$ within search spaces $SS(1)$–$SS(L+1)$ will be $LN^2$ and the number of polyline contours with L segments will be $N^L$. Thus, for the example shown in FIGS. 2A–2D and 6, where N equals 25 and L equals seven, the total number of line segments $\phi$ within search spaces $SS(1)$–$SS(8)$ equals $(7)(25^2)$, a number less than five thousand, while the total number of polyline contours equals $25^7$, a number in excess of six billion! Consequently, the goal of search STEP 44 is to conduct a systematic search using a minimum number of computer computations and a conservative amount of memory to find the set of optimal polyline contours $[\phi_l^1]$–$[\phi_l^k]$ for all images in image sequence $[I_k]$.

Figure 7:
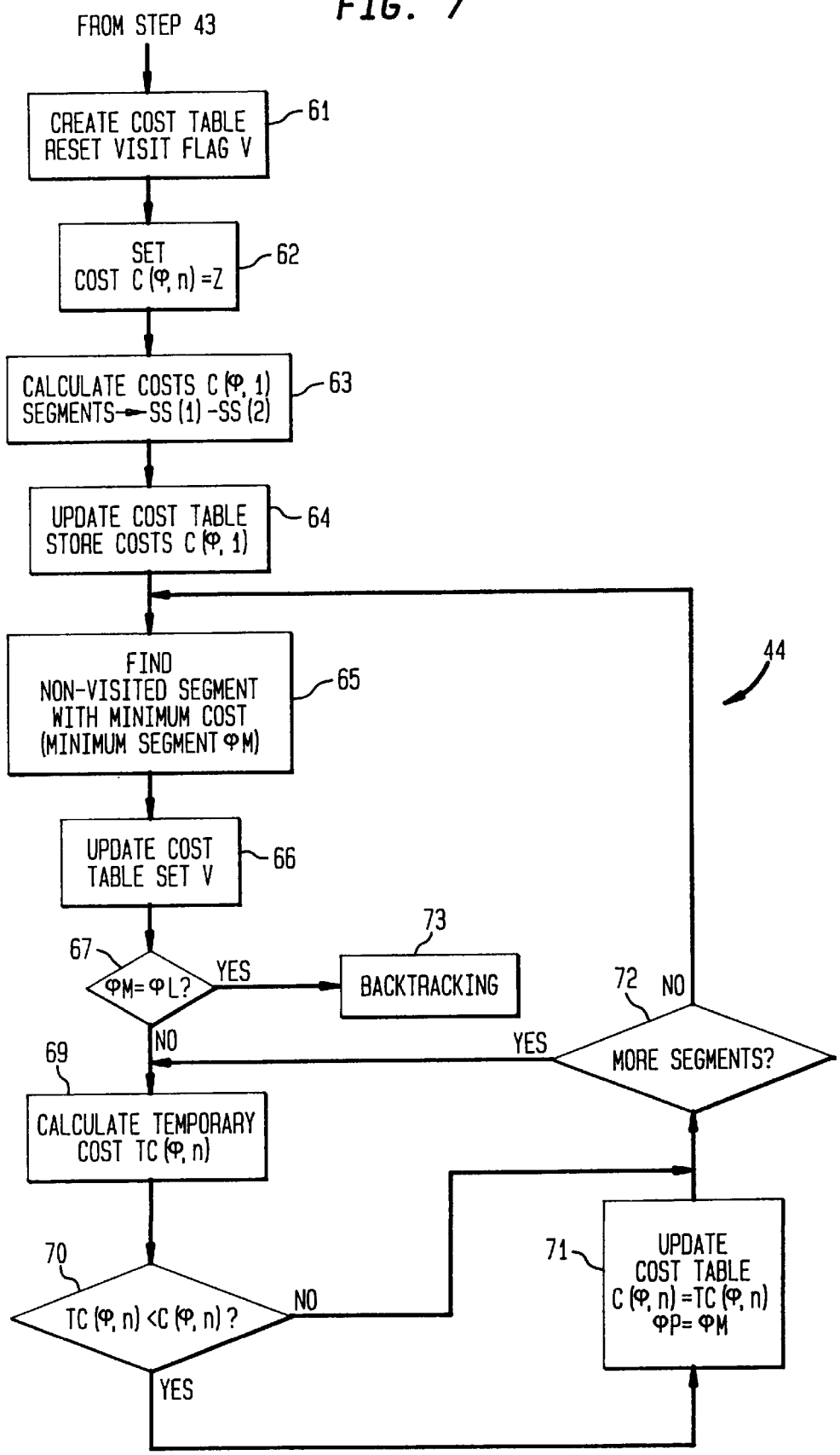
FIG. 7 is a high-level flow chart illustrating a searching procedure using graph exploration which forms a part of the optimal polyline routine of FIG. 5.

Search STEP 44 detailed in FIG. 7 begins with STEP 61 wherein computer 13 creates a cost table that stores cost data for all of the $LN^2$ line segments $\phi$ within search spaces $SS(1)$–$SS(L+1)$. Each entry of the cost table includes the following data for a different line segment $\phi$:

| DATA ITEM | SYMBOL | DATA DESCRIPTION |
| --- | --- | --- |
| (A) | X(i,j) | start of line segment $\varphi$. |
| (B) | Y(i,j) | end of line segment $\varphi$. |
| (C) | SS(l) | search space for point X(i,j). |
| (D) | SS(l + 1) | search space for point Y(i,j). |
| (E) | C($\varphi$,n) | cost of polyline that ends with line segment $\varphi$ in group n. |
| (F) | n | line segment group index. |
| (G) | $\varphi$P | previous segment. |
| (H) | V | visit flag. |
| (I) | A | line segment number. |

Each entry in the cost table relates to a different one of the $LN^2$ possible line segments $\phi$ in search spaces $SS(1)$–$SS(L+1)$. Data item (A), point X(i,j), identifies the coordinates at the start of line segment $\phi$. Data item (B), point Y(i,j), identifies the coordinates at the end of line segment $\phi$. Data item (C) identifies search space $SS(l)$ to which point X(i,j) belongs while data item (D) identifies search space $SS(l+1)$ to which point Y(i,j) belongs. Search space identification data is important here since search spaces may overlap causing one or more pixels to be common to multiple search spaces.

Data item (E) identifies polyline cost $C(\phi,n)$ for line segment $\phi$. Data item (F) contains line segment group index n. For instance, line segments extending between search spaces SS(1) and SS(2) belong to the first group (n=1), those extending between search spaces SS(2) and SS(3) belong to the second group (n=2) and so forth. When calculating polyline costs C($\phi$,n) for a specific line segment in group n, a calculation is made with respect to a line segment in the previous group (n−1); the corresponding line segment in group (n−1) is referred to herein as previous segment $\phi$P. Consequently, when storing a particular polyline cost C($\phi$,n), data item (E), computer 13 also stores the related previous segment $\phi$P, data item (G). Because line segments $\phi$ in the first group (n=1) have no previous line segment $\phi$P, data item (G) for these line segments $\phi$ will remain blank. Visit flag V, data item (H), identifies whether or not the corresponding line segment $\phi$ has been found to be a minimum segment $\phi$M as will be described below with respect to final STEP 65 of FIG. 7. Finally, each table entry has a mine segment number A, i.e., data item (I). Consequently, line segment $\phi$ may be identified by either the pixel coordinates (i,j) of its end points or its line segment number A.

Referring to FIG. 7, set STEP 62 sets all polyline costs C($\phi$,n), data items (E), to a value approaching infinity or, more accurately, to a very large number Z that will be greater than the largest expected value of a calculated polyline cost C($\phi$,n). Calculate STEP 63 calculates polyline costs C($\phi$,1) for all line segments $\phi$ in the first group (n=1), i.e., those line segments extending between search spaces SS(1)–SS(2). In the case where search spaces SS(1) and SS(2) each contain N pixels, there would be a total of $N^2$ line segments $\phi$ in the first group. Therefore, calculate STEP 63 would perform $N^2$ polyline cost C($\phi$,1) calculations. It is again noted that line segments $\phi$ extending between search spaces SS(1) and SS(2) do not have a previous segment $\phi$P. The appropriate cost function corresponding to line segments $\phi$ in the first group, i.e., those extending between search spaces SS(1)–SS(2), may be calculated using the following Equation (12) which is the sum of Equations (1) and (7):

$$C(\phi,1) = e_1(\phi) + \alpha e_2(\phi',\phi). \quad (12)$$

Update STEP 64 updates data items (E) in the cost table. Specifically, computer 13 replaces the currently stored polyline cost, originally set to the value Z, with the newly calculated polyline costs C($\phi$,1) obtained in calculate STEP 63. Thus, at this point, data item (E) for each of the $N^2$ first-group line segments in search spaces SS(1)–SS(2) will contain a calculated cost C($\phi$,1), while the remaining table entries will still contain the value Z for data item (E).

In find STEP 65, computer 13 searches all polyline costs C($\phi$,n) of non-visited table entries, i.e., visit flags V are in a reset state, to find the non-visited line segment $\phi$ with the minimum polyline cost C($\phi$,n). The corresponding line segment is referred to herein as minimum segment $\phi$M. In STEP 66, the visit flag V, data item H, is set for the minimum segment $\phi$M to indicate that the corresponding line segment was visited.

Computer 13 then executes decision STEP 67 to determine whether or not minimum segment $\phi$M, found in the last iteration of find STEP 65, is between the last two search spaces SS(L) and SS(L+1), meaning that its group number n, data item (F), would be L, i.e., $\phi M = \phi_L$. A yes (Y) result in decision STEP 67 causes backtracking STEP 73 (see FIG. 8) to be invoked. A no (N) result in STEP 67 causes computer 13 to proceed to a cost calculation loop that includes STEPS 69–72. For each iteration of calculate STEP 69, computer 13 calculates temporary cost TC($\phi$,n) for those polylines ending with line segments $\phi$ that extend from point Y(i,j) in search space SS(n), i.e., the endpoint of the minimum segment $\phi$M found in the last iteration of find STEP 65, to search space SS(n+1). To obtain the necessary temporary polyline cost TC($\phi$,n) associated pith each line segment in group n extending from point Y(i,j), calculate STEP 69 uses Equation (10b).

Decision STEP 70 compares the temporary cost TC($\phi$,n) calculated in the last execution of calculate STEP 69 to the previously stored polyline cost C($\phi$,n), data item (E). If the just calculated temporary cost TC($\phi$,n) is less than the stored polyline cost C($\phi$,n), the cost table is updated in STEP 71 by placing the value of TC($\phi$,n) in data item (E), i.e., setting C($\phi$,n) equal to the just calculated value of TC($\phi$,n). Additionally, previous segment $\phi$P, data item (G), is set equal to the line segment number A of minimum segment $\phi$M found in the last execution of find STEP 65. If, in decision STEP 70, the just calculated temporary cost TC($\phi$,n) is found to be greater than or equal to the previously stored polyline cost C($\phi$,n), data items (E) and (G) are not changed.

After performing STEPS 70 and possibly 71, decision STEP 72 executes to see whether or not calculate STEP 69 has processed all line segments $\phi$ extending from point Y(i,j) of the last found minimum segment $\phi$M to search space SS(n+1). If additional line segments $\phi$ need to be processed, the cost calculation process returns to calculate STEP 69, via the yes (Y) output of decision STEP 72, and performs another iteration of STEPS 69–72 for another line segment $\phi$. After computer 13 has processed all those line segments $\phi$ in group n which extend from point Y(i,j) of the last found minimum segment $\phi$M, find STEP 65 is executed. Further iterations of STEPS 65–67 and the cost calculation loop, STEPS 69–72, are then conducted until decision STEP 67 finds that the last found minimum segment $\phi$M is in the last group ($\phi M = \phi_L$); at this point the cost table contains sufficient data for backtracking STEP 73 to select the desired optimal polyline contour $[\phi_I^k]$ for image $I_k$. Consequently, when decision STEP 67 finds that the last found minimum segment $\phi$M extends between the last two search spaces SS(L) and SS(L+1), i.e., $\phi M = \phi_L$, backtracking STEP 73 (see FIG. 8) is invoked.

Figure 8:
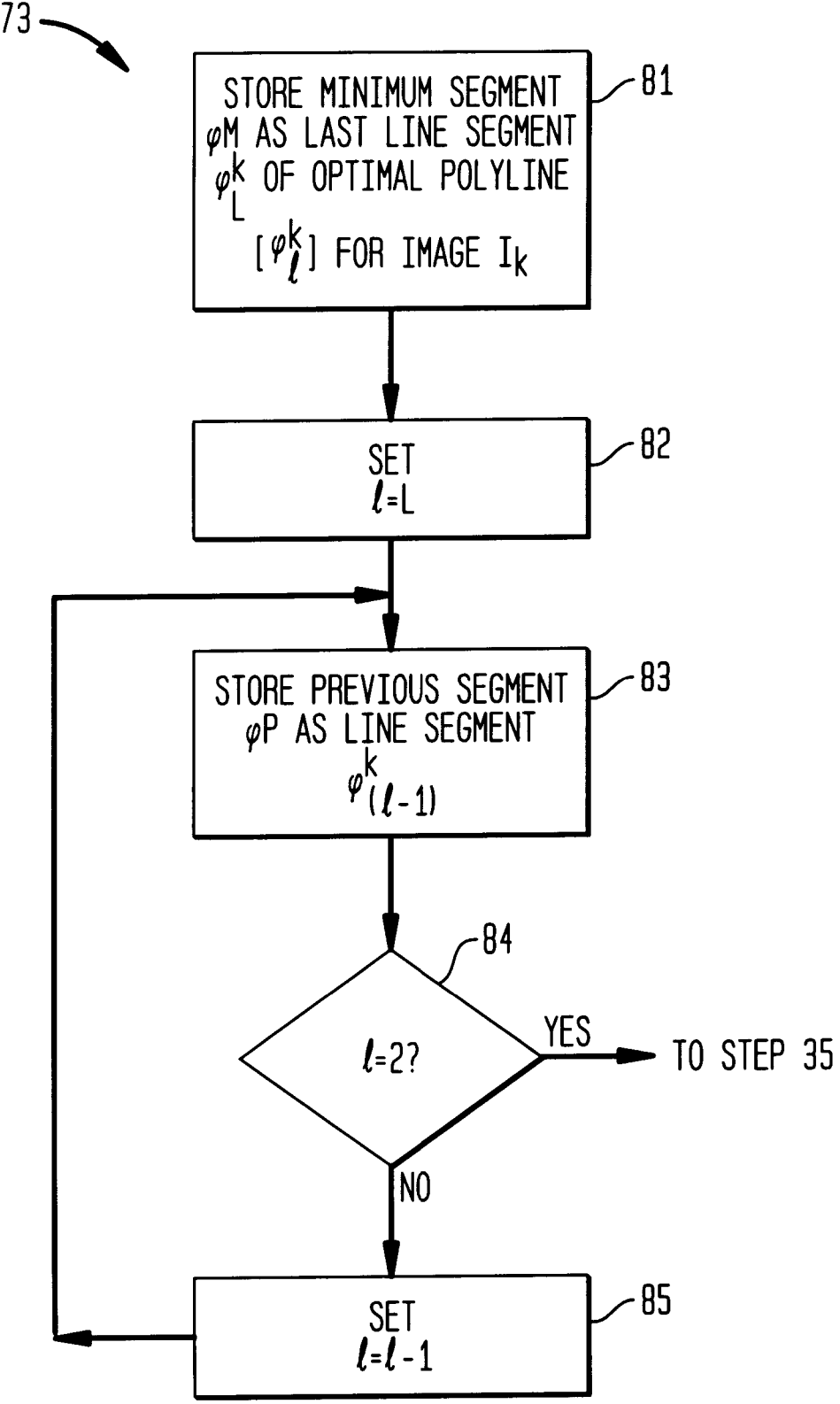
FIG. 8 is a high-level flow chart illustrating a backtracking process which forms a part of the searching procedure of FIG. 7.

Referring to FIG. 8, backtracking STEP 73 selects and stores appropriate line segments $\phi$ from the cost table to form the desired optimal polyline contour $[\phi_I^k]$ for image $I_k$. Backtracking STEP 73 selects the necessary set of line segments $\phi_I^k$ by starting with the last line segment $\phi_L^k$ and working toward the first line segment $\phi_1^k$. More specifically, backtracking STEP 73 begins with store STEP 81 wherein the last found minimum segment $\phi$M is selected and stored as being the last line segment $\phi_L^k$ of the desired optimal polyline contour $[\phi_I^k]$ for image $I_k$. Set STEP 82 next sets l equal to L. Store STEP 83 selects and stores the corresponding previous segment $\phi$P contained in data item (G) as being the previous line segment $\phi_{(L-1)}^k$. Decision STEP 84 tests l for the value two. If l does not equal two, l is decremented to the value l−1 in set STEP 85, after which store STEP 83 is again invoked. Since l has been decremented, store STEP 83 again selects and stores a previous segment $\phi$P. At this point, however, the previous segment $\phi$P selected will be found at data item (G) at the table entry corresponding to the previous segment $\phi$P that was selected in the previous iteration of store STEP 83. Further iterations will cause store STEP 83 to select a chain of related previous segments $\phi$P starting with a segment from the last group (n=L) and working toward the front to end with a segment from the first group (n=1). The iteration in which store STEP 83 selects the first line segment $\phi_1^k$, and, therefore, all necessary line segments, will occur when the segment index l equals 2. Consequently, STEPS 83, 84 and 85 are executed serially until such time that decision STEP 84 finds l equal to two, at which time image tracking process 30 returns to STEP 35 (see FIG. 3) for processing the next image $I_{(k+1)}$. As explained above, the complete set of optimal polyline contours $[\phi_I^1]-[\phi_I^k]$ for tracking the selected object in all images of image sequence $[I_k]$ is stored in store STEP 38.

Obviously many modifications and variations of the present invention are possible in the light of the above teachings. For example, while the above description suggests that a user may select the object of interest manually from monitor 14, automated means may be provided for selecting objects and producing initial polyline contour $[\phi'^1_I]$.

It is also noted that the size of search spaces SS is crucial. If a search space is too small, the correct pixel in an image may not be found. If a search space is too large, the execution time may become unacceptable. Additionally, to help alleviate this problem and decrease execution time, a pyramid approach can be used where the image is decreased in size up to a certain level. The polyline is first searched for in the highest level of the pyramid and later brought down to the full resolution image. Further, cost functions associated with other image features, e.g., ridges, gray-level distributions and textures, can be accomodated to solve a particular problem.

As mentioned above, a need exists in the medical field for improved techniques of automatically, or semi-automatically, detecting and displaying enhanced images of arteries in motion. Physicians widely use digital coronary angiography to provide enhanced fluoroscopic visualization and immediate, high quality replay of cine sequences, often called cineangiograms, for diagnosis of such conditions as arterial stenosis. However, under a two-dimensional X-ray projection of the type found in a typical cineangiogram, a beating heart can cause an image of attached arteries to move and deform a great deal. That motion often makes it very difficult for an observer to focus on a particular area that may need special attention.

To improve visualization of such medical images, "stenosis-stabilized" cine loop display techniques, which significantly improve the detection of low-contrast features, have been developed. The Eigler et al article, and the Whiting et al and Roehm et al patents, cited above, describe stabilizing techniques for enhancing the visualization of cineangiograms. The general principle of these techniques is to produce a stabilized display around a fixed point in a cineangiogram by digitally translating each frame of the cineangiogram sequence to that fixed point. An observer-performance study showed that stenosis detection with a stabilized display was more reliable and took less time than with conventional cineangiograms.

While the general principle of achieving such stability may be relatively simple, automatically finding a correspondence in each frame of an image sequence containing a complex network of objects can be a more involved task. The Roehm et al patent describes an image tracking system which produces a stabilized cineangiogram by automatically tracking in subsequent computer images a feature that a user identified with a cursor in a first computer image. The system displays image data such that the selected feature remains motionless in the cineangiogram. The tracking is accomplished by finding a location within a tracking window where the image data in a search kernel correlates best with the image data around a feature of interest. A major drawback of this approach is that when image data inside a search kernel does not have rich enough image features, false correspondence may give the best correlation. Thus, an image sequence or cineangiogram can be successfully stabilized in this instance only at a relatively distinct feature point, such as a branching point in an artery tree. Unfortunately, stenosis can occur anywhere in an artery tree and a reliable system should not be limited to tracking and stabilizing only strong feature points. As such, a critical problem with tracking and/or stabilizing a point in the middle of an artery branch using a technique like that described in the Roehm et al patent is that there are normally not many features in a neighborhood around that point to distinguish it from another point on the same or a different artery.

The present invention employs an alternative technique of generating a stabilized cineangiogram. Specifically, a user initially displays a first frame of a cineangiogram and selects a point of interest on any portion of a coronary artery around which motion should be stabilized. The system then automatically identifies an associated section of the selected artery that includes the selected point. The shape of this arterial section is now used as the basis of tracking. The present technique enables the user to select a point anywhere in an artery tree.

The present invention recognizes that an object of interest in a cineangiogram is essentially one-dimensional and that there is no need to use a two-dimensional correlation scheme to track it. Instead, the present technique models a one-dimensional arterial feature, e.g., a ridge or edge on a section of artery, as a polyline contour and uses that contour to track the artery as it moves and deforms due to the beating of the heart. It is also recognized that an artery of sufficient length maintains a general shape in the sense that straight segments usually remain substantially straight and curved segments usually remain curved. Thus, the selected arterial section is made long enough so that it will include many interesting feature points such as high curvature points and straight segments. Since the corresponding active polyline contour is object-oriented, the present approach is robust to image intensity variations, large motions and deformations.

FIGS. 9A–9F comprise six consecutive x-ray frames from a conventional cineangiogram. The six frames of FIGS. 9A–9F, which contain respective digital images 90A–90F, delimit five equal time intervals of one cardiac cycle; the last frame (see FIG. 9F) corresponds to the first frame (similar to FIG. 9A) of the next cardiac cycle. Thus, a complete cineangiogram, which generally includes frames covering four or five cardiac cycles, may contain several sets of digital images similar to images 90A–90F. Additionally, the time period of a normal cardiac cycle for a resting heart is in the order of a second. This, a physician examining a conventional cineangiogram may be viewing a four- or five-second period in which the heart executes four or five cardiac cycles.

Images 90A–90F each display artery tree 91 with rectangular grid 92 superimposed thereon. Artery tree 91, which had been injected with a radiopaque material, includes a number of distinct features, such as bifurcation points, artery branches and crowded artery regions. Each FIGS. 9A–9F also includes a cross, which marks a typical user-selected point P on a predetermined section of artery tree 91. As can be seen by comparing FIGS. 9A–9F, point P moves considerably with respect to stationary grid 92 due to the normal beating of a heart from which the artery extends.

Image 90A shows the positions of artery tree 91 and point P just before the heart relaxes and begins to fill with blood. Images 90B–90D show a sequence of positions of artery tree 91 and point P as the relaxed heart continues to expand and fill with blood. Image 90E shows the positions of artery tree 91 and point P substantially at the time that the heart is fully dilated and just as the heart begins to contract. The period covered by images 90A–90E corresponds to a diastole stage of a cardiac cycle. A systole stage of a cardiac cycle occurs when a heart rapidly contracts and pumps blood to the body. During the systole stage, artery tree 91 and point P moves rapidly from the position shown in image 90E to the position shown in image 90F, which, analogous to image 90A, represents the start of the next cardiac cycle. Overall, images 90A to 90F show that an artery can move considerably during a cardiac cycle. Additionally, in the relatively short period of time between images 90E and 90F, i.e., during a systole stage when the heart contracts, artery tree 91 moves rapidly through a relatively large distance. Thus, when examining a conventional cineangiogram, a viewer must first mentally select point P from a first image and then visually follow a section of artery encompassing point P as that artery section moves from image to image. As explained above, this arterial motion, inherent in a conventional cineangiogram, can seriously impede user visualization. On the other hand, cineangiograms that are stabilized about a user-selected point considerably improve user visualization.

Figure 9A:
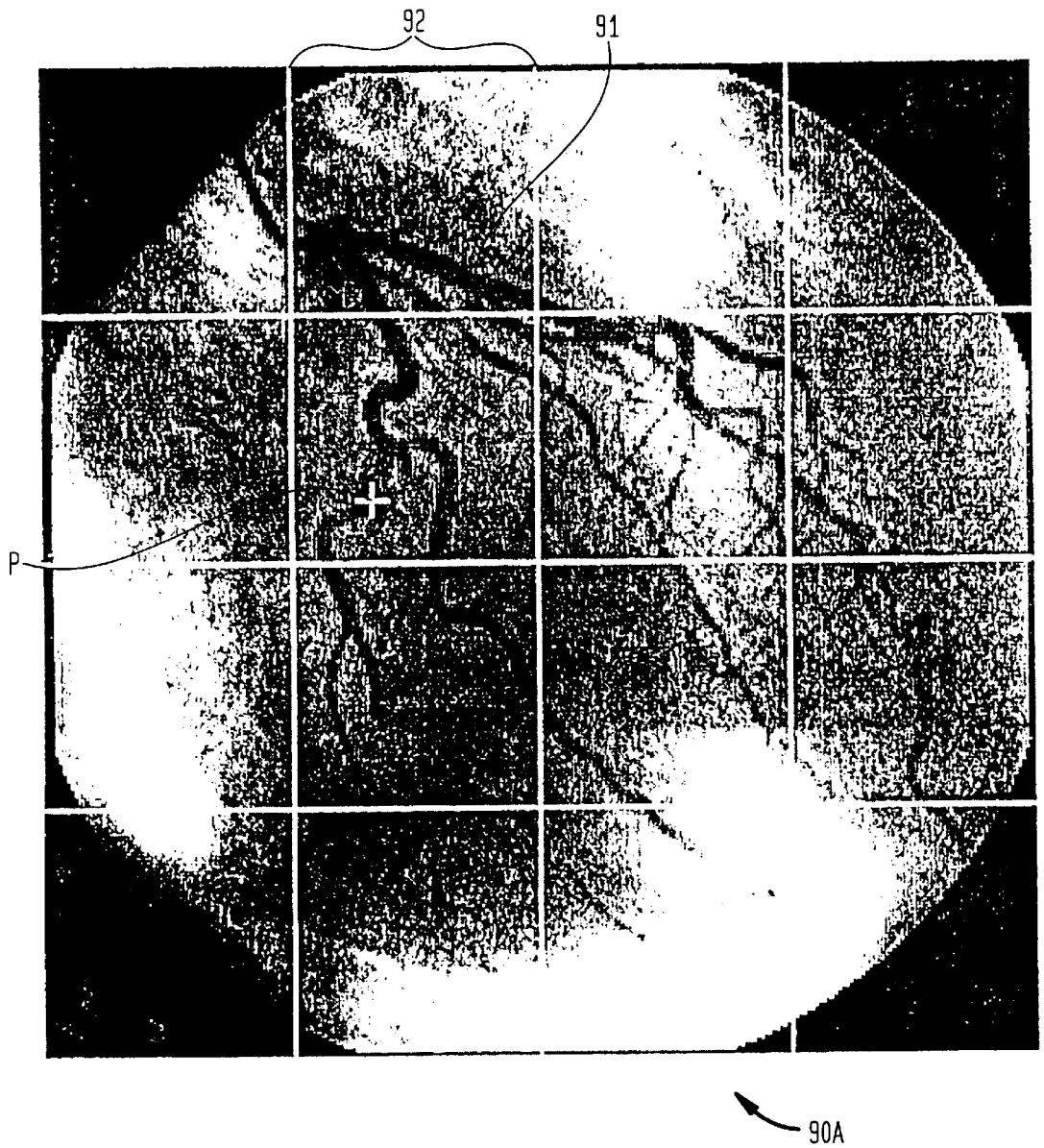
FIGS. 9A–9F illustrate six consecutive x-ray images or angiograms which form part of a conventional cineangiogram.
Figure 9B:
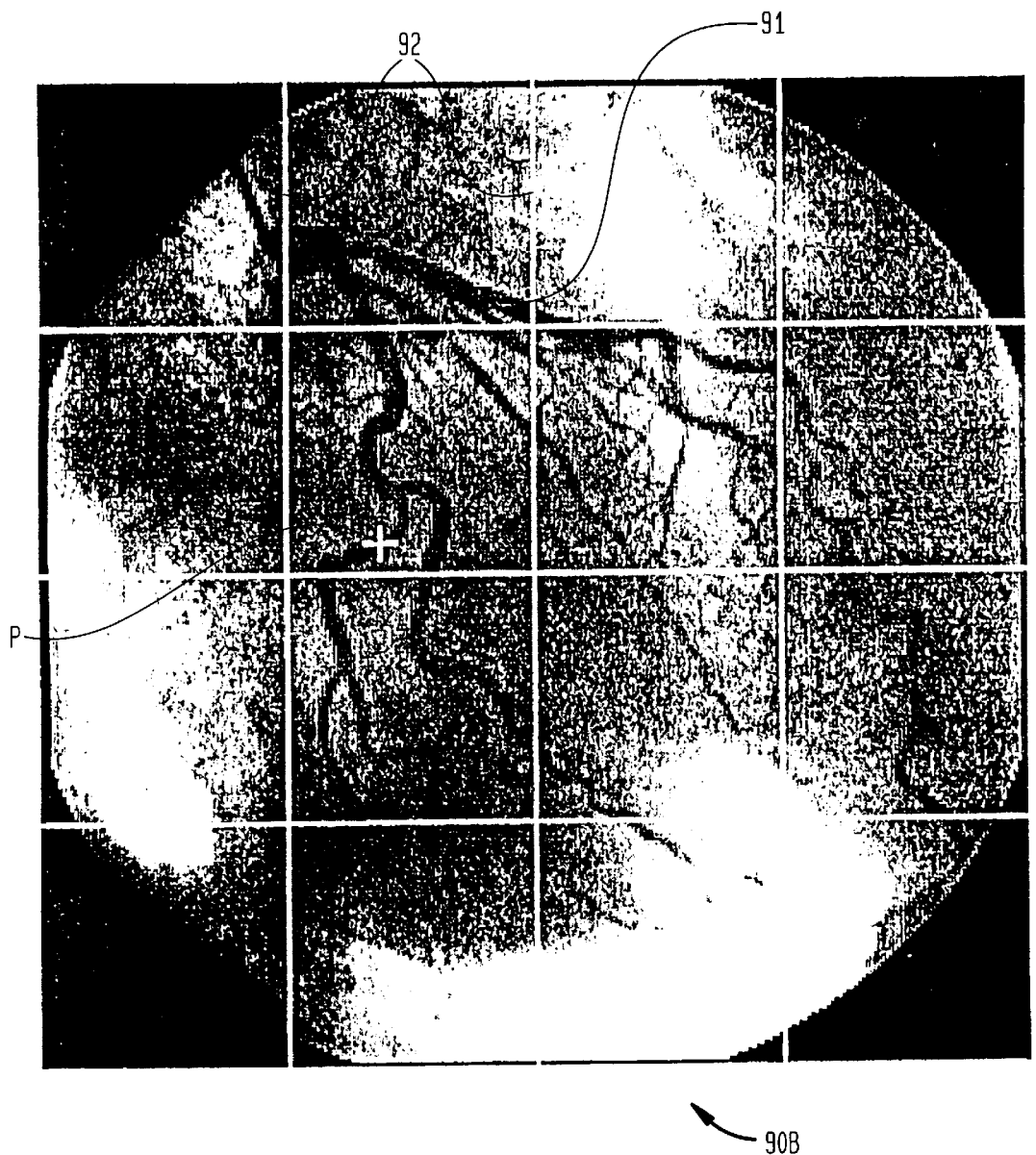
Figure 9C:
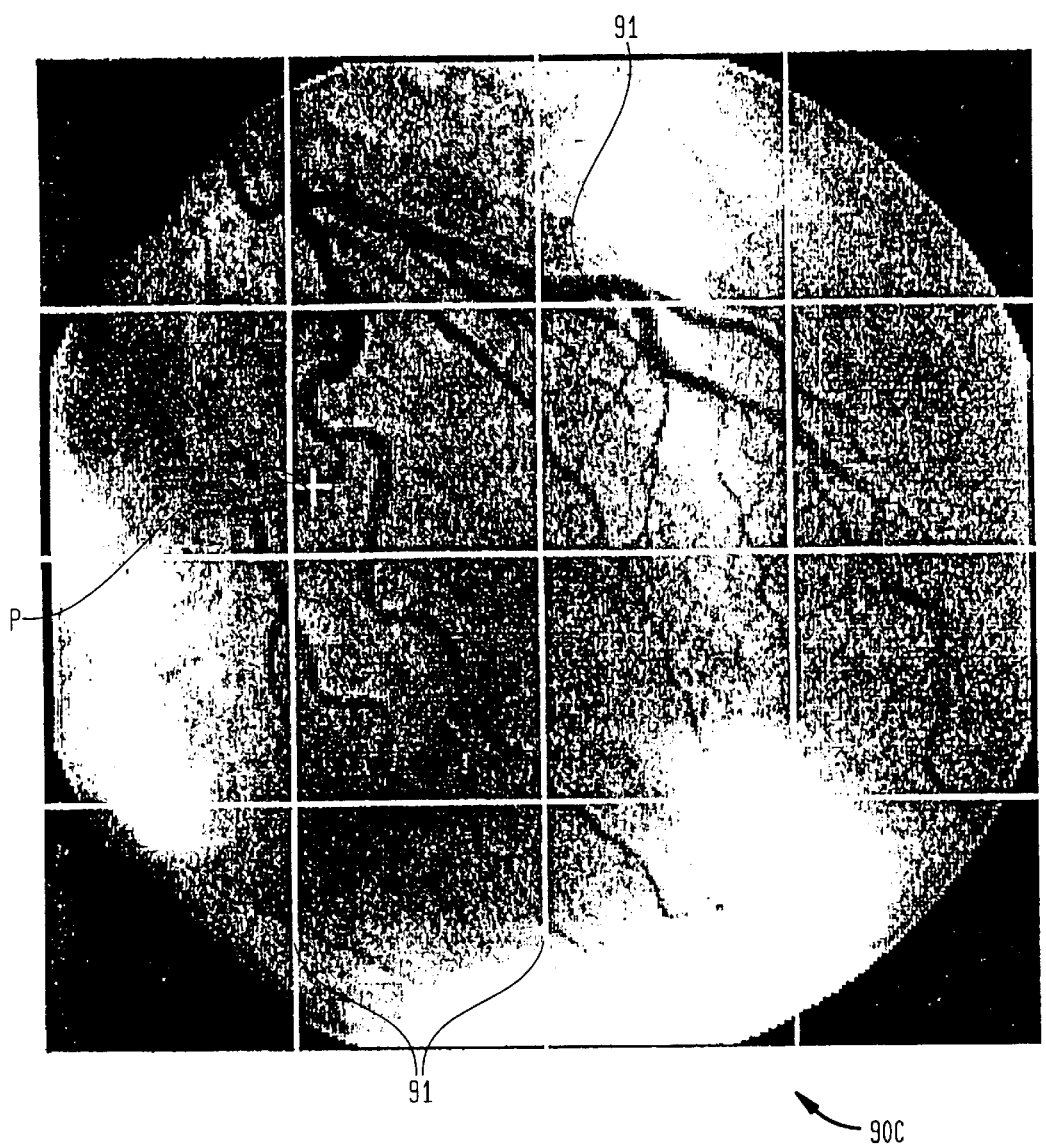
Figure 9D:
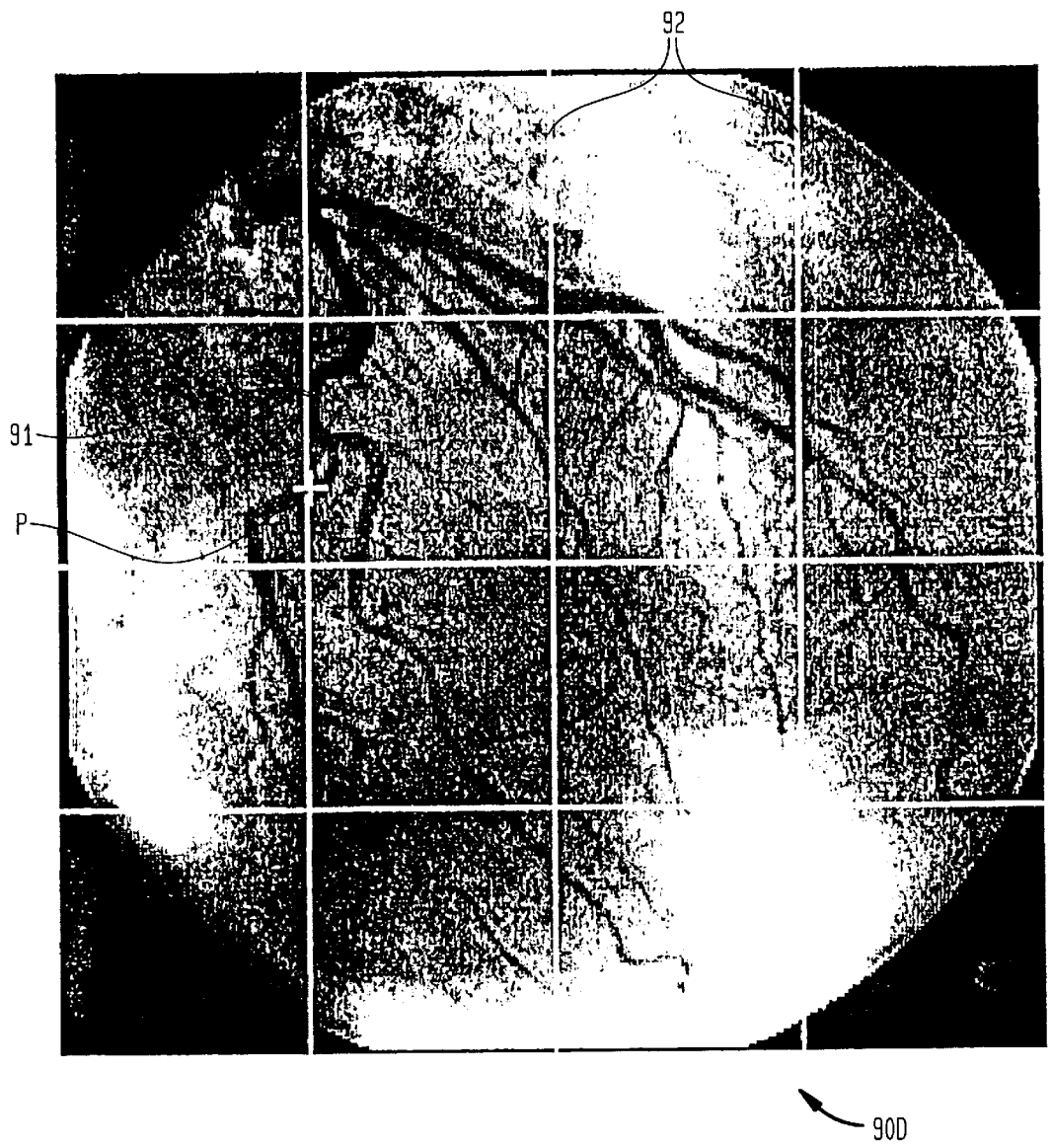
Figure 9E:
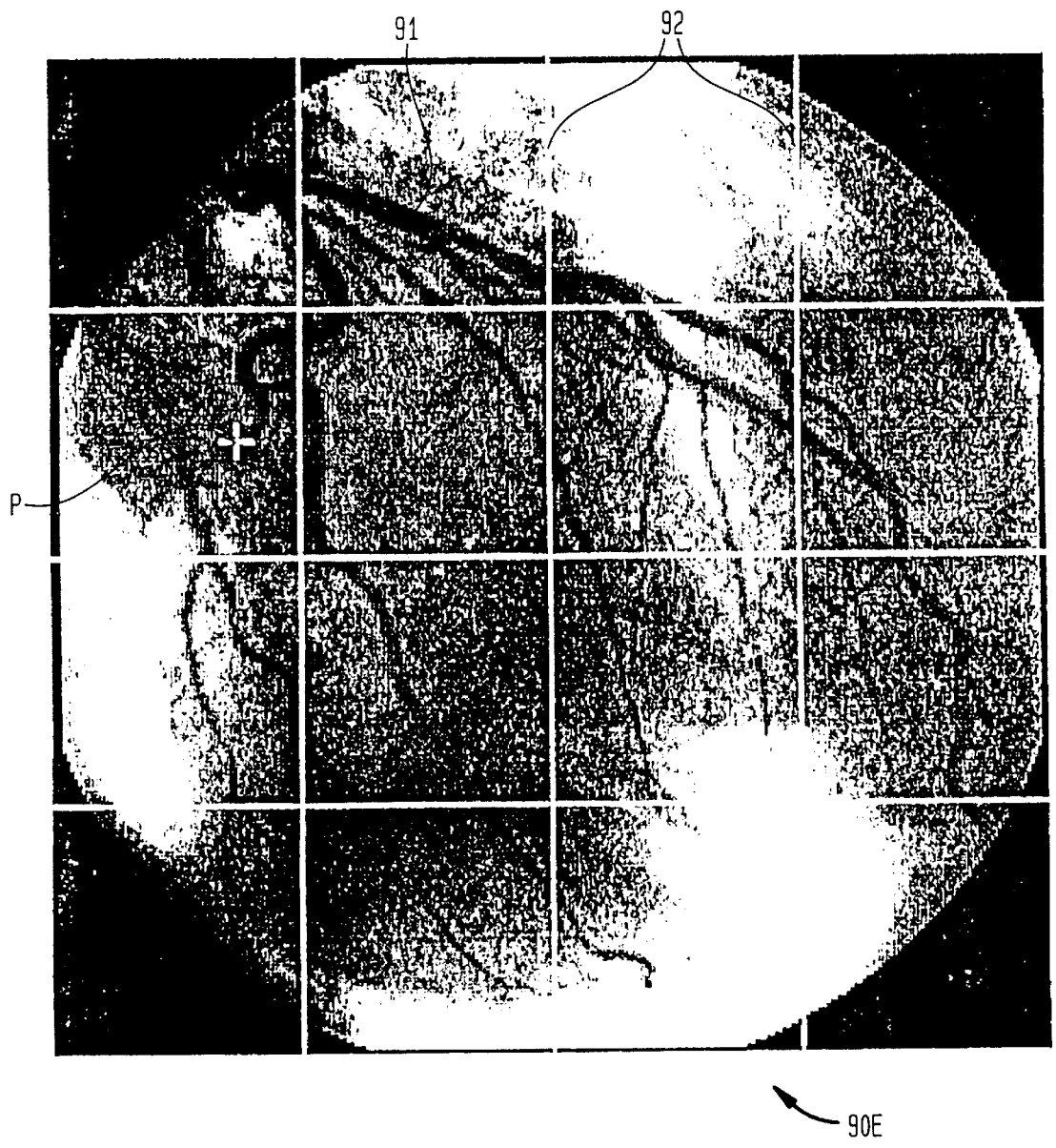
Figure 9F:
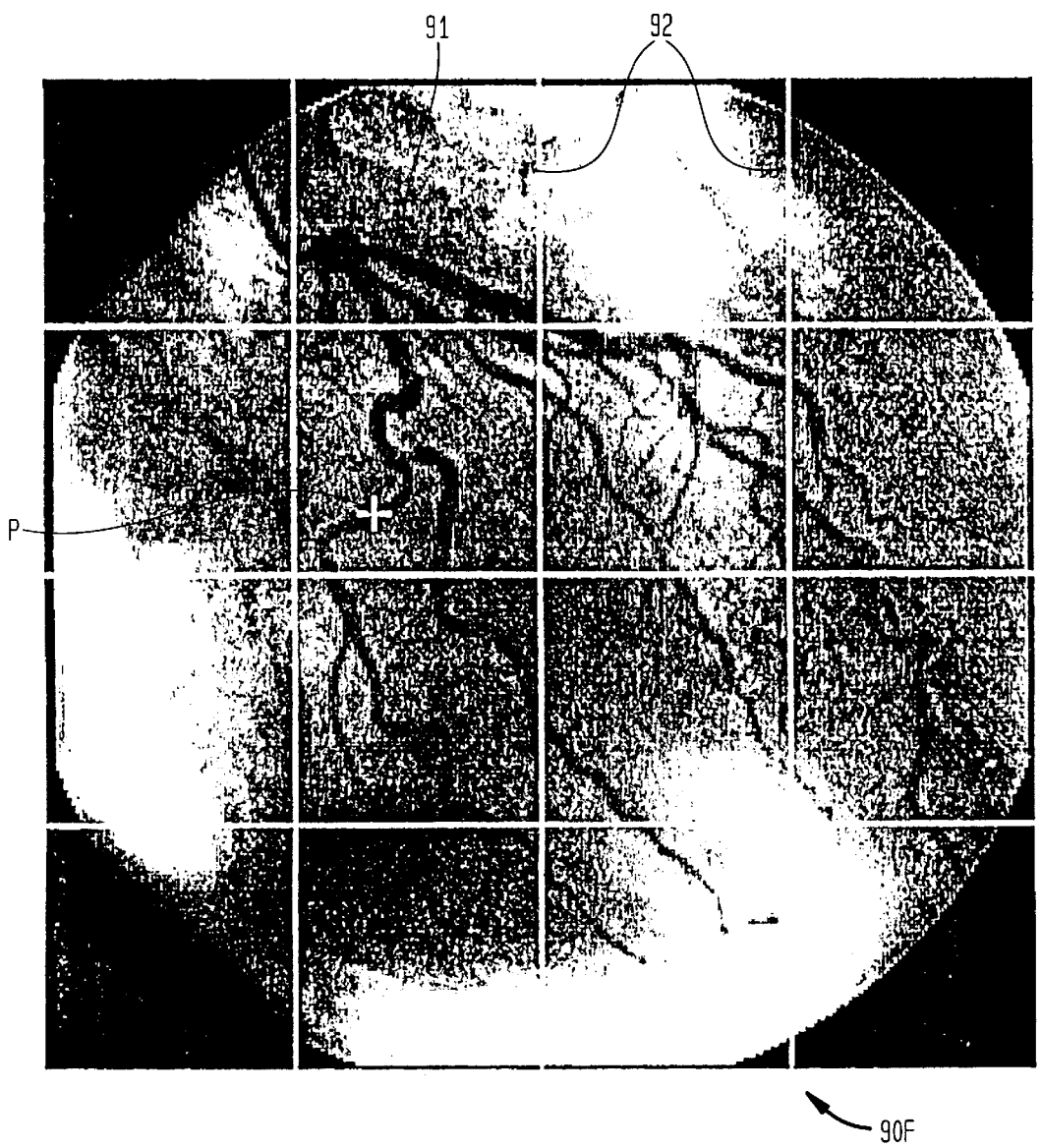
Figure 10:
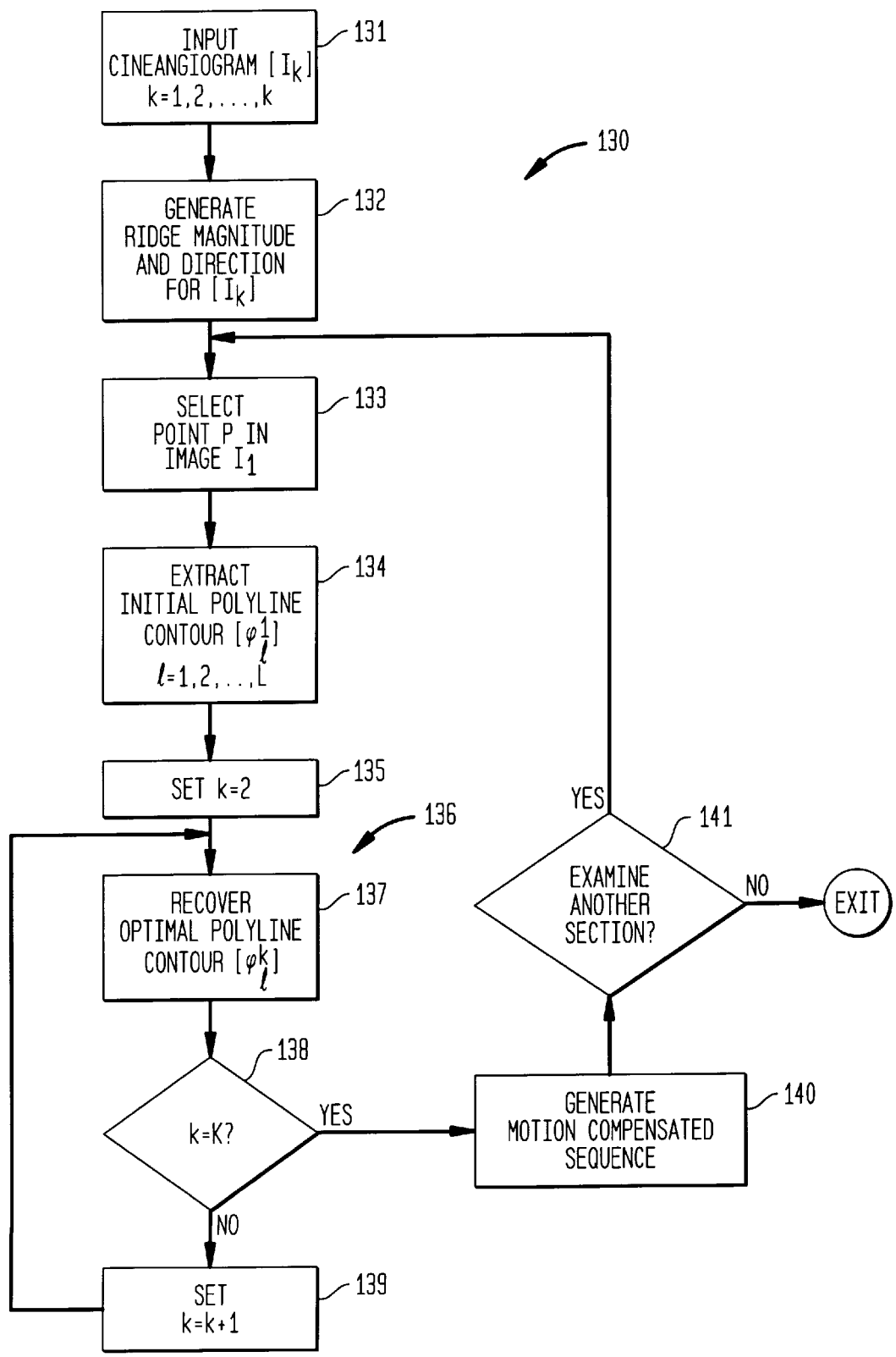
FIG. 10 depicts a high-level flow diagram of a motion compensation method capable of producing stabilized cineangiograms in accordance with the present invention.

FIG. 10 depicts a high-level flow diagram of motion compensation process 130, which generates a stabilized cineangiogram from a conventional cineangiogram. The following description of motion compensation process 130 makes particular reference to FIGS. 1, 9A–9F and 10. Motion compensation process 130 begins with input STEP 131, wherein computer 13 (see FIG. 1) receives image sequence $[I_k]$, where k=1, 2, . . . , K, from image processor 12. For the following description, image sensor 11 is assumed to be a conventional x-ray machine of the type used in angiography while image sequence $[I_k]$ is assumed to be a conventional digital cineangiogram, referred to below as cineangiogram $[I_k]$. Cineangiogram $[I_k]$ comprises K digital angiograms $I_k(i,j)$ similar to the x-ray frames in FIGS. 9A–9F.

After receiving cineangiogram $[I_k]$ in STEP 131, computer 13 generates ridge response data in STEP 132 by calculating ridge magnitude RM and ridge direction RD data at each pixel location for each angiogram $I_k$. Computer 13 preferably generates the required ridge response data in accordance with a multiscale ridge detection technique described in the following article: Koller et al, "Multiscale detection of curvilinear structures in 2-D and 3-D image data", *Proc. Int. Conf. Computer Vision*, Cambridge, Mass., pp. 864–869, 1995 (referred to herein as the Koller et al article).

Figure 11:
FIG. 11 shows an image of ridge magnitude data for a corresponding image in FIG. 9A.

The ridge detection technique disclosed in the Koller et al article is analogous to an edge detection technique of the type described above in the sense that it provides magnitude and direction information. Specifically, the appropriate first and second partial derivatives of the image intensity are approximated at every pixel using finite differences on a smoothed version of an input image, and then used to estimate the total orientation of a line structure. The final ridge response is then obtained by combining the evidence of edges in the direction perpendicular to the local line structure at a distance equal to the smoothing factor. The process is repeated across a number of smoothing factors (or scales) and the maximum ridge response is retained in a table for every pixel along with the local line direction at which this maximum was obtained. The image in FIG. 11 shows a typical ridge magnitude for image 90A in FIG. 9A. The intensity at each pixel in FIG. 11 is proportional to the value of ridge magnitude RM at that pixel. Computer 13 stores the results obtained in generate STEP 132 in a ridge response table having an entry for each pixel of each angiogram $I_k$. Each entry of the ridge response table contains the following data:

| DATA ITEM | DATA DESCRIPTION |
| --- | --- |
| (A1) | angiogram number k; |
| (B1) | pixel coordinates i and j; |
| (C1) | ridge magnitude RM; and |
| (D1) | ridge direction RD. |

In select STEP 133, a user displays first angiogram $I_1$, i.e., the first frame of cineangiogram $[I_k]$, on monitor 14 and activates mouse 15 to select point P on any portion of an artery that the user is interested in examining. In response, computer 13 executes extract STEP 134 to extract initial polyline contour $[\phi_l^1]$, where l=1, 2, . . . , L, which substantially outlines the centerline or ridge of an arterial section containing point P in first angiogram $I_1$. The details of extract STEP 134 appear below with respect to a description of FIGS. 12–17.

Next, computer 13 recovers an optimal polyline contour in each of the remaining angiograms $(I_2-I_K)$ of cineangiogram $[I_k]$. To perform this function, computer 13 first sets index k equal to a value two in set STEP 135 and then enters contour recovery loop 136, which comprises STEPS 137, 138 and 139. Computer 13 processes each angiogram $(I_2-I_K)$ in succession during each iteration of recover STEP 137. The details of recover STEP 137 appear below with respect to a description of FIGS. 19 and 20. Computer 13 exits contour recovery loop 136 after obtaining a complete set of optimal polyline contours $[\phi_l^1]-[\phi_l^k]$.

For example, during the first iteration of contour recovery loop 136, computer 13 processes angiogram $I_2$ in recover STEP 137, thereby producing optimal polyline contour $[\phi_l^2]$. The value of index k, which has a value of two during the first iteration of decision STEP 138, is then compared to a value K. Assuming that index k is less than a value K, computer 13 exits the NO path of decision STEP 138, increments index k in STEP 139 and returns to recover STEP 137 to process the next angiogram. Consequently, in the second iteration of contour recovery loop 136, computer 13 processes third angiogram $I_3$, i.e., the third frame of cineangiogram $[I_k]$, to obtain optimal polyline contour $[\phi_l^3]$. Finally, after processing all angiograms $(I_2-I_K)$ and obtaining the last optimal polyline contour $[\phi_l^k]$ in recover STEP 137, computer 13 exits the YES path of decision STEP 138. At this point, motion compensation process 130 advances to generate STEP 140.

Using a complete set of optimal polyline contours $[\phi_l^1]-[\phi_l^k]$, obtained during execution of recovery loop 136, computer 13 generates and stores, during execution of generate STEP 140, a motion compensated image sequence, i.e., a stabilized cineangiogram, in a manner which is described below in detail with respect to FIG. 21. After computer 13 has executed generate STEP 140, the user may display the stored stabilized cineangiogram on monitor 14 and examine the designated arterial section while point Q (near user-selected point P) remains motionless on monitor 14. Finally, a user exits the motion compensation process 130 via the NO path of decision STEP 141 or, alternatively, proceeds to select STEP 133 via the YES path of decision STEP 141 for stabilizing and examining another arterial section.

Figure 12:
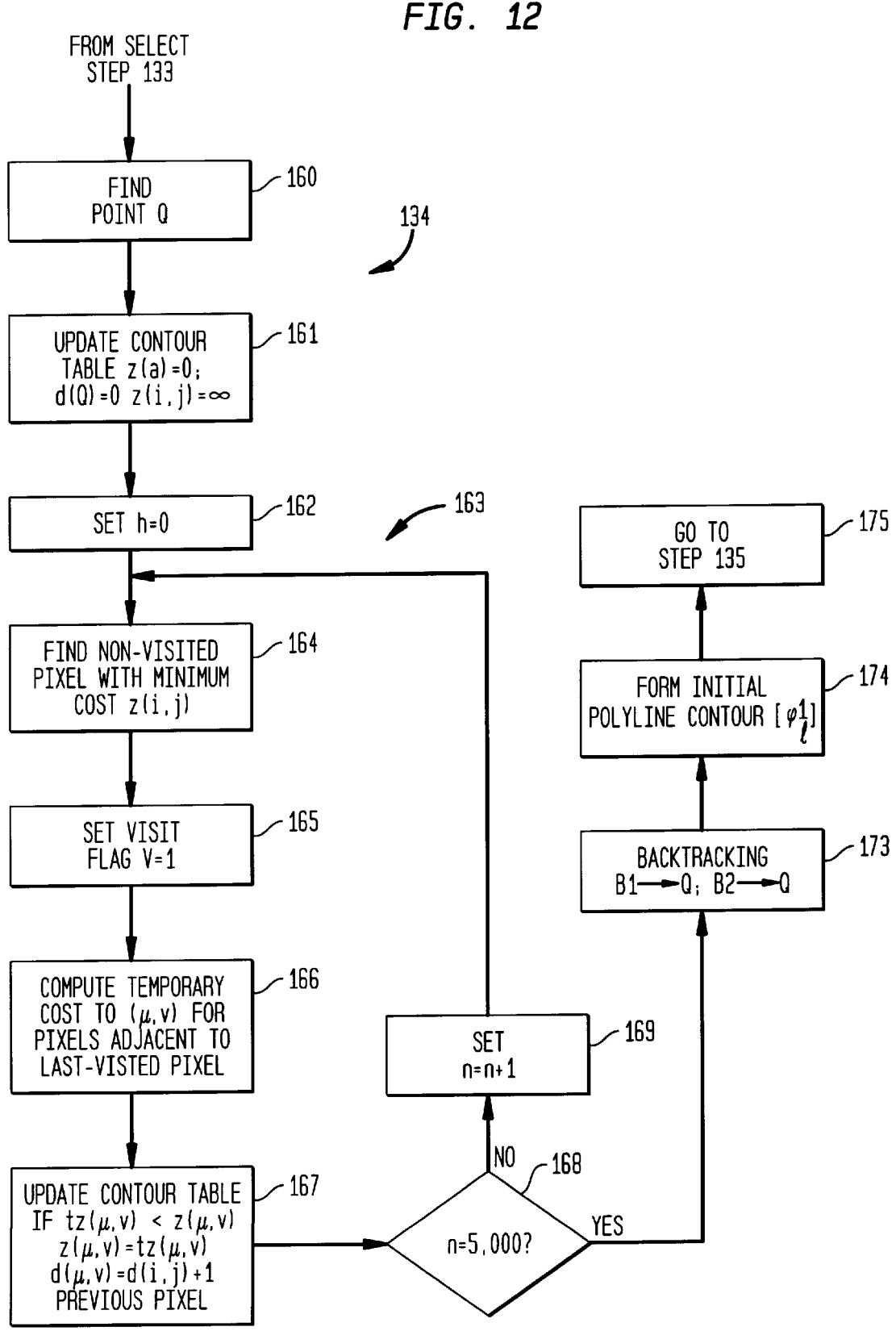
FIG. 12 depicts a high-level flow diagram illustrating a portion of the motion compensation method of FIG. 10.
Figure 13:
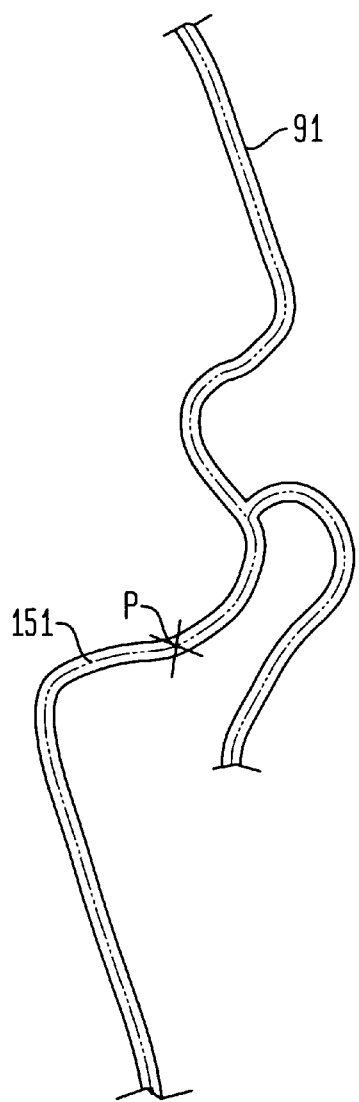
FIG. 13 schematically illustrates a portion of an artery tree contained in the angiogram of FIG. 9A.
Figure 14:
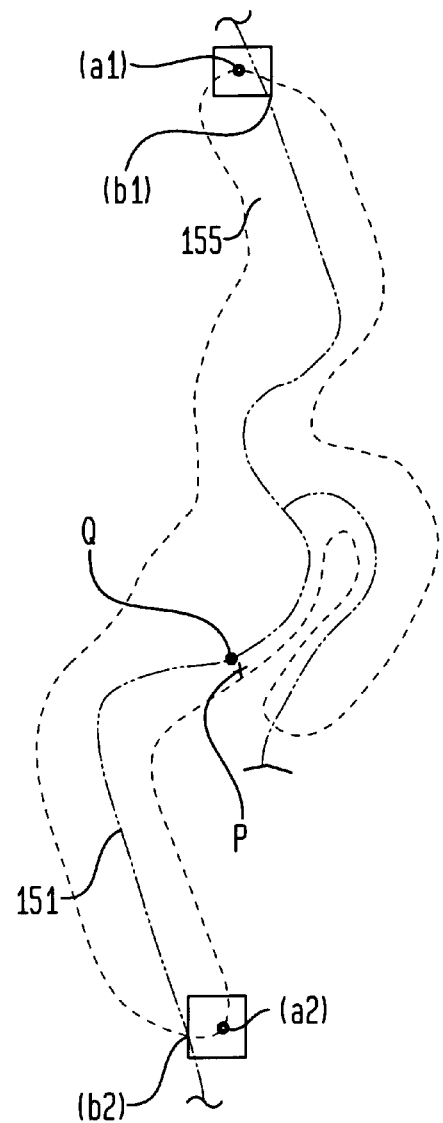
FIG. 14 diagrammatically shows a centerline for the arterial portion illustrated in FIG. 13.
Figure 15:
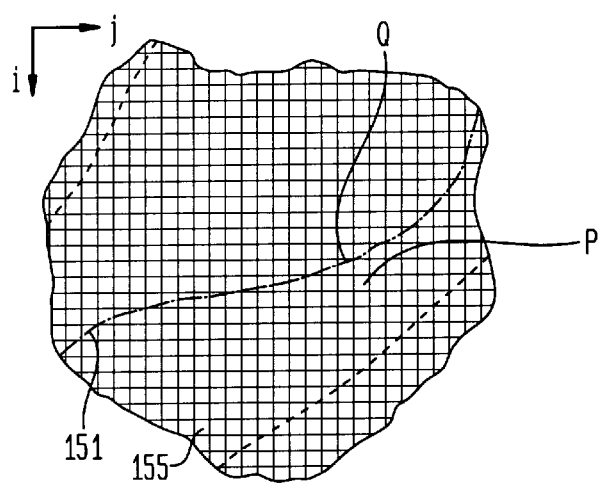
FIGS. 15–17 diagrammatically show pixel arrays, which correspond to enlarged cut-away sections of an angiogram in FIG. 9A.
Figure 16:
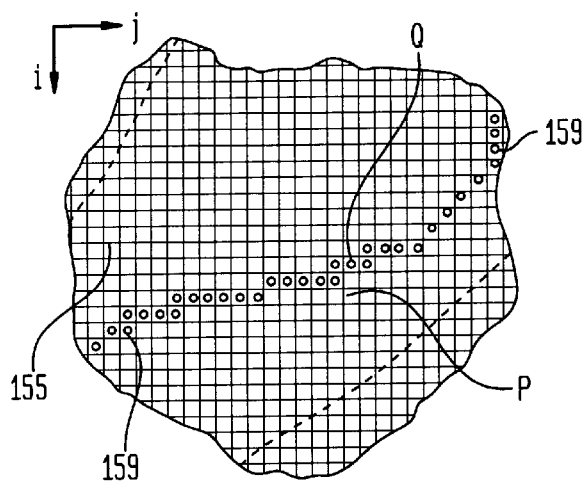
Figure 17:
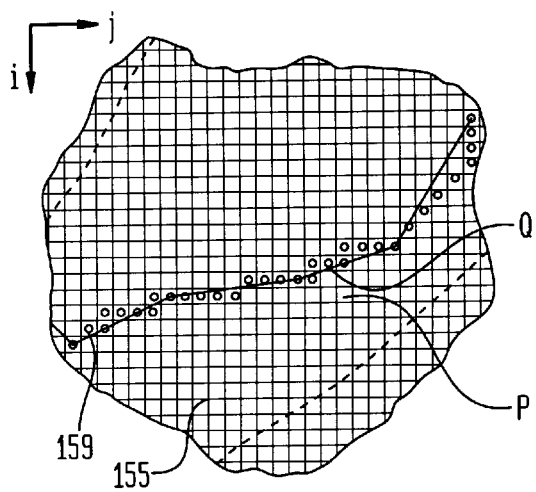

FIG. 12 depicts a high-level flow diagram of extract STEP 134, which will now be described with particular reference to FIGS. 13–17. FIGS. 13–17 schematically illustrate a portion of image 90A of FIG. 9A, showing a sector of artery tree 91 containing user-selected point P. Briefly, FIG. 13 schematically portrays arterial centerline 151 as a phantom line within artery tree 31. FIG. 14 shows arterial centerline 151 with point Q placed thereon a short distance from point P. A dashed line outlines visit space 155, which envelopes arterial centerline 151. FIGS. 15–17 each comprise a rectangular grid having squares that schematically represent an array of pixels with pixel coordinates i and j as indicated. Superimposed on each array of pixels are points P and Q, and dashed lines outlining visit space 155. FIG. 15 also shows arterial centerline 151. FIG. 16 shows a series of dots placed within those pixels that are intersected by centerline 151 in FIG. 5. The set of pixels with dots in FIG. 16 make up ridge contour 159. Finally, FIG. 17 shows a portion of active polyline contour $[\phi_I^k]$ extending through vertices D to outline ridge contour 159.

The flow diagram FIG. 12 will now be described with particular reference to the schematic illustrations of FIGS. 13–17. In extract STEP 134, computer 13 extracts initial polyline contour $[\phi_I^1]$ in the first angiogram $I_1$, i.e., the first frame of cineangiogram $[I_k]$. When performing select STEP 133, a user rarely selects point P directly on centerline 151. Thus, computer 13 begins the contour extraction process by first finding, in find STEP 160, a point Q that resides on centerline 151 near point P (see FIGS. 13–15). To find an appropriate point Q, computer 13 looks in a small neighborhood of point P to find a pixel having maximum ridge magnitude RM. To perform this function, computer 13 searches the ridge response table described above. The small neighborhood, which typically might include a 7×7 pixel region centered on point P, would be chosen large enough, however, so that it overlapped pixels on centerline 151. Consequently, since point Q will be that pixel having maximum ridge magnitude RM, computer 13 will have located a pixel that falls on ridge contour 159 (see FIG. 16). It is an object of the contour extraction process performed in extract STEP 134 to find the remaining pixels on ridge contour 159. To perform this function, computer 13 forms a contour table having the following entries for each pixel in the first angiogram $I_1$:

| DATA ITEM | DATA DESCRIPTION |
| --- | --- |
| (A2) | pixel coordinates i and j; |
| (B2) | pixel cost Z(i,j); |
| (C2) | previous pixel coordinates u and v; |
| (D2) | pixel distance d(i,j) from point Q; and |
| (E2) | visit flag V. |

Data item (A2) identifies the location of the pixel in the angiogram $I_1$. For data item (B2), computer 13 calculates pixel cost Z(i,j) according to the following equation:

$$Z(i, j) = Z(u, v) + \frac{1}{RM(i, j) + \varepsilon} + |RD(u, v) - RD(i, j)| \quad (13)$$

where:
  Z(i,j) is the pixel cost of a current pixel, having pixel coordinates i and j, with respect to a corresponding previous pixel identified in data item (C2) with pixel coordinates u and v;
  Z(u,v) is the pixel cost of the previous pixel, which cost is found in data item (B2) for the previous pixel entry in the contour table;
  RM(i,j) is the ridge magnitude of the current pixel, which is found in data item (C1) of the ridge response table;
  $\varepsilon$ is an arbitrarily small positive number that is added to ridge magnitude RM(i,j) to prevent the denominator of the second term on the right side of Equation (13) from being zero;
  RD(i,j) is the ridge direction of the current pixel, which is found in data item (D1) for the current pixel entry in the ridge response table; and
  RD(u,v) is the ridge direction of the previous pixel, which is found in data item (D1) for the previous pixel entry in the ridge response table.

After finding point Q in find STEP 160, computer 13 updates the contour table in update STEP 161 for the pixel at point Q, as follows: at data item (B2) pixel cost Z(Q), i.e., pixel cost Z(i,j) for point Q, is set equal to zero while all other pixel costs Z(u,v) are set equal to a value approaching infinity (an arbitrarily large number); and at data item (D2) for point Q, the pixel distance d(Q) is set equal to zero, indicating that that pixel corresponds to point Q. Computer 13 then sets an index n to a value zero, in STEP 162, and enters search loop 163 made up of STEPS 164–169.

Search loop 163 begins with find STEP 164 wherein computer 13 searches all non-visited pixels in the first image, i.e., those pixel entries in the contour table where visit flag V in data item (E2) equals zero. Computer 13 searches for the non-visited pixel having the minimum pixel cost Z(i,j) in data item (B2). In set STEP 165, visit flag V in data item (E2) for the pixel located in the last iteration of search STEP 164 is set equal to a value one, indicating that that pixel has been visited.

For example, in the first iteration of search loop 163, computer 13 will find that the pixel at point Q is a non-visited pixel (because its visit flag V equals zero) and has the minimum pixel cost at data item (B2) (because in update STEP 161 Z(Q) was set equal to zero while all other pixel costs were made arbitrarily large). Thus, in the first iteration of set STEP 165, visit flag V for point Q is set equal to a value one, indicating that the pixel at which point Q is located has been found to have a minimum pixel cost and was therefore visited.

Next, search loop 163 proceeds to compute STEP 166 wherein Temporary cost tZ(u,v) is calculated for each of the eight pixels immediately adjacent to the last-visited pixel (indices u and v vary between (i−1) and (i+1), and (j−1) and (j+1), respectively). Computer 13 calculates temporary cost tZ(u,v) using Equation (13).

In update STEP 167, computer 13 compares each of the eight temporary costs tZ(u,v) with its corresponding pixel cost Z(u,v) presently stored in the contour table at data item (B2) for each of the eight pixels involved. When a calculated temporary cost tZ(u,v) is found to be less than its corresponding pixel cost Z(u,v), the contour table is updated in update STEP 167 as follows: pixel cost Z(u,v) in data item (B2) is set equal to the value of the lower temporary cost tZ(u,v); coordinates i and j of the previous pixel (i.e., the last-visited pixel) are saved in data item (C2); and pixel distance d(u,v) in data item (D2) is set equal to [d(i,j)+1], i.e., the pixel distance d(i,j) of the last-visited pixel is incremented and stored in data item (D2).

In the first iteration of search loop 163, the last-visited pixel will be the one containing point Q. Thus, for each pixel entry updated in the first iteration of update STEP 167, the pixel coordinates i and j of point Q will be saved in data item (C2). Additionally, for the updated pixels, the pixel distance d(u,v) in data item (D2) will be set equal to one, indicating that that pixel is one pixel removed from point Q.

Next, index n is compared to a total iteration value, e.g., a value 5,000, in decision STEP 168. When index n is found to be less than 5,000, the process exits the NO path of decision STEP 168, increments index n in set STEP 169 and returns to find STEP 164 wherein computer 13 again searches the updated contour table for the non-visited pixel with the minimum cost Z(i,j). Computer 13 then marks the minimum-cost pixel located in find STEP 164 as visited (see set STEP 165) and computes a new temporary cost tZ(u,v) for each of the eight pixels adjacent thereto (see compute STEP 166). Computer 13 compares each new temporary cost tZ(u,v) to its corresponding pixel cost Z(u,v) as stored in data item (B2), and updates the contour table in accordance with update STEP 167. The searching process of search loop 163 continues for 5,000 iterations, thereby flagging in data item (E2) an equal number of pixels as having been visited. The 5,000 visited pixels will surround and intersect centerline 151 to form visit space 155 as depicted in FIGS. 14 and 15.

After completing 5,000 iterations, computer 13 exits search loop 163 via the YES path of decision STEP 168 to backtracking STEP 173. The goal of backtracking STEP 173 is to locate the ridge contour pixels (marked with dots in FIGS. 16 and 17) that make up ridge contour 159. In backtracking STEP 173, computer 13 looks at the contour table for the visited pixel that has the largest distance d(i,j) from point Q, i.e., the pixel in visit space 155 with the largest value for data item (D2). Illustratively, FIG. 14 shows pixel (a1) to be a visited pixel having the largest distance d(i,j) from point Q. Backtracking STEP 173 causes computer 13 to look in a small neighborhood of pixel (a1), exemplified in FIG. 14 with a box surrounding pixel (a1) that intersects centerline 151 within visit space 155, for the visited pixel with the minimum cost Z(i,j), exemplified by pixel (b1) on centerline 151. It is noted that for a given pixel located on contour ridge 159, its corresponding previous pixel will be adjacent to the given pixel and will also be on contour ridge 159. Consequently, in backtracking STEP 173, computer 13 starts with pixel (b1) and, using the previous pixel coordinates u and v in data item (C2), works backwards to locate the series of pixels on ridge contour 159 between pixel (b1) and point Q. After reaching point Q from pixel (b1), thereby locating one side of ridge contour 159, backtracking STEP 173 repeats the process to find the other side of ridge contour 159. Specifically, computer 13 looks at the contour table for the visited pixel that has the largest distance d(i,j) on the other side of point Q. Illustratively, FIG. 14 shows pixel (a2) to be the relevant pixel. Backtracking STEP 173 looks in a small neighborhood of pixel (a2) for the visited pixel therein with the minimum cost Z(i,j), exemplified by pixel (b2) on centerline 151. Computer 13 starts with pixel (b2) and, using the previous pixel information in data item (C2), works backwards to locate the pixels on ridge contour 159 between pixel (b2) and point Q.

In form STEP 174, computer 13 forms initial polyline contour $[\phi_I^1]$ by assigning selected pixels along ridge contour 159 to be the vertices D of initial polyline contour $[\phi_I^1]$ as illustrated in FIG. 17. For the FIG. 17 example, vertices D appear at every eighth pixel on ridge contour 159. The set of pixel coordinates i and j for the vertices D delineate initial polyline contour $[\phi_I^1]$. Finally, in go to STEP 175, the process returns to set STEP 135 (see FIG. 10) of motion compensation process 130.

Figure 18:
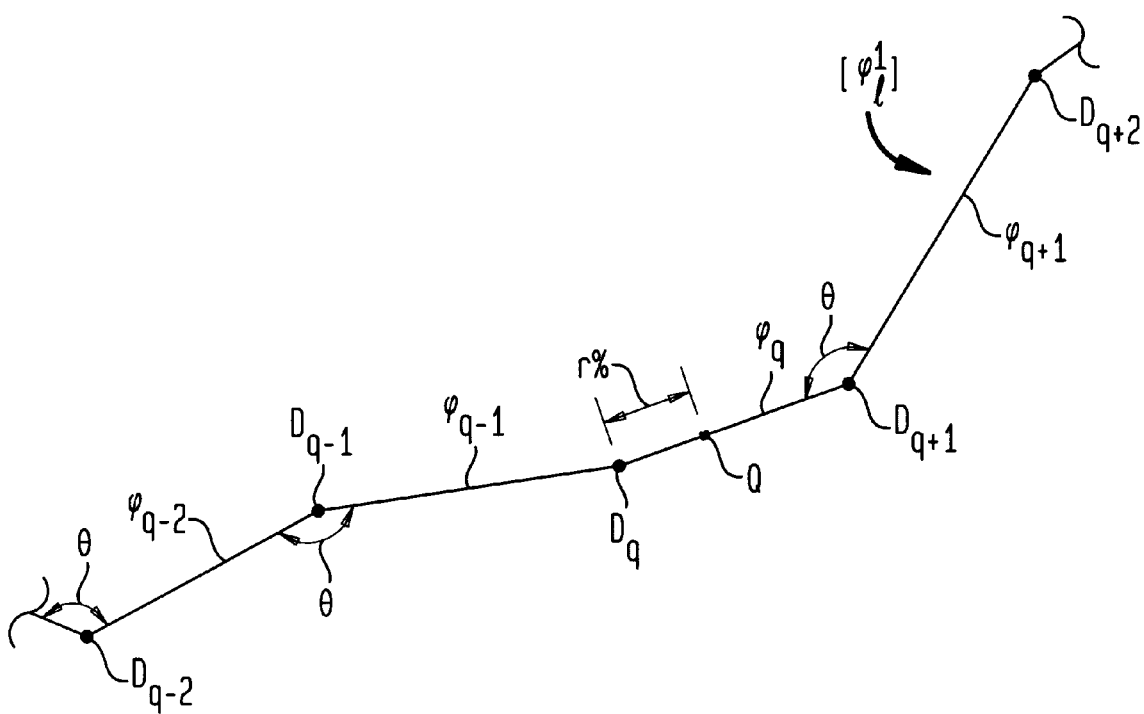
FIG. 18 diagrammatically shows a portion of a polyline contour illustrated in FIG. 17.

FIG. 18 shows an enlarged replica of a portion of initial polyline contour $[\phi_I^1]$, which was defined by vertices D in form STEP 174. The portion of initial polyline contour $[\phi_I^1]$ illustrated in FIG. 18 includes line segments $\phi_{q-2}$, $\phi_{q-1}$, $\phi_q$ and $\phi_{q+1}$, vertices D(q-2), D(q-1), D(q), D(q+1) and D(q+2), and vertex angles θ. FIG. 18 shows point Q located on line segment $\phi_q$ and spaced from vertex Dq a distance that is r% of the total distance between vertices D(q) and D(q+1). Motion compensation process 130 starts with initial polyline contour $[\phi_I^1]$, exemplified in FIG. 18, to recover a complete set of optimal polyline contours $[\phi_I^1]$–$[\phi_I^k]$ in recover STEP 137.

Figure 19:
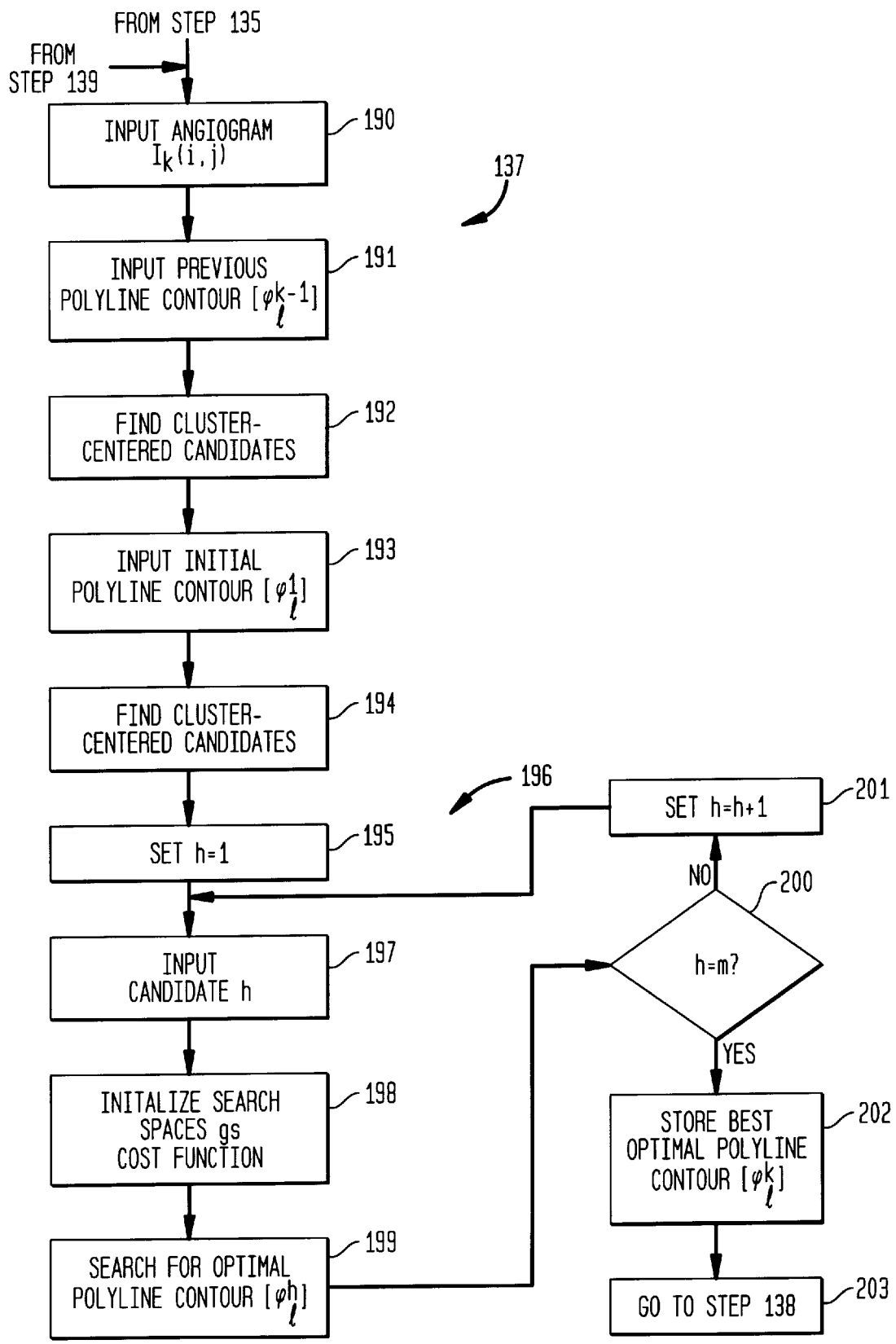
FIG. 19 depicts a high-level flow diagram illustrating another portion of the motion compensation method of FIG. 10.

FIG. 19 illustrates the details of the optimal polyline recovery process executed in recover STEP 137. The recovery process begins with input STEPS 190 and 191. In input STEP 190, computer 13 inputs the next angiogram $I_k$ to be processed as determined by the value of index k, which was last set in either set STEP 135 or set STEP 139 of FIG. 10. In input STEP 191, computer 13 inputs the previous polyline contour $[\phi_I^{k-1}]$. Using the inputted previous polyline contour $[\phi_I^{k-1}]$ as a pattern, computer 13 executes find STEP 192 to search within a predetermined portion of the current angiogram $I_k$ for a first set of cluster-centered candidates, which constitute a set of best matches between previous polyline contour $[\phi_I^{k-1}]$ and the ridge response data in angiogram $I_k$ being processed. Computer 13 performs a similar search in find STEP 194 with respect to initial polyline contour $[\phi_I^1]$, which is input in input STEP 193. In find STEP 194, computer 13 locates a second set of cluster-centered candidates, which constitute a set of best matches between initial polyline contour $[\phi_I^1]$ and the ridge response data in current angiogram $I_k$.

Figure 20:
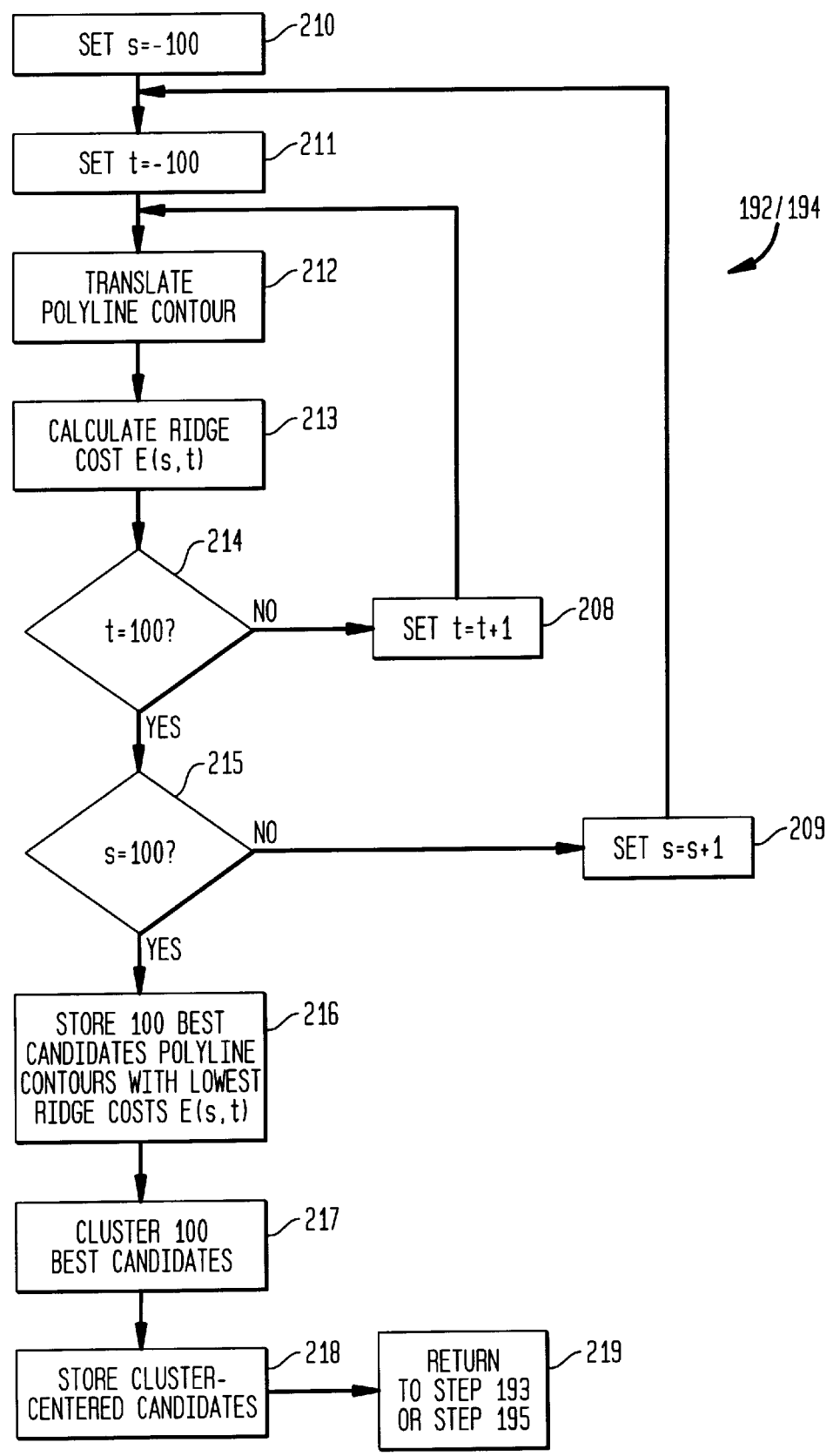
FIG. 20 depicts a high-level flow diagram illustrating a further portion of the motion compensation method of FIG. 10.

FIG. 20 illustrates the search processes performed in find STEP 192 and find STEP 194, which differ only in the source of the polyline contour being processed. When executing find STEP 192, computer 13 performs the FIG. 20 search over a predetermined area of a current angiogram $I_k$ with respect to previous polyline contour $[\phi_I^{k-1}]$. On the other hand, when executing find STEP 194, computer 13 performs the same FIG. 20 search over the same predetermined area of a current angiogram $I_k$, but with respect to initial polyline contour $[\phi_I^1]$. In the FIG. 20 example, the search area extends 100 pixels on all sides of previous polyline contour $[\phi_I^{k-1}]$, if find STEP 192 is being executed, or 100 pixels on all sides of initial polyline contour $[\phi_I^1]$, if find STEP 194 is being executed. Thus, computer 13, in STEPS 210 and 211, will initialize each of the respective pixel indices s and t to a value of –100.

The FIG. 20 process will first be described with respect to find STEP 192. Computer 13 translates, in translate STEP 212, the previous polyline contour $[\phi_I^{k-1}]$ furnished in input STEP 191 by an amount s and t. Then, in calculate STEP 213, computer 13 evaluates ridge cost E(s,t) for the translated version of previous polyline contour $[\phi_I^{k-1}]$ in accordance with the following equation:

$$E(s, t) = \sum_{l=1}^{L} \frac{1}{U(\varphi) + \varepsilon} \quad (14)$$

where:

$$U(\varphi) = \frac{\sum_{(i,j) \in \varphi} \left[ RM(i, j) h(\vec{\varphi} \cdot \vec{RD}(i, j)) \right]}{\sum_{(i,j) \in \varphi} 1}; \quad (15)$$

ε is an arbitrarily small positive number that is added to U (φ) to prevent the denominator of Equation (14) from being zero;

RM(i,j) is the ridge magnitude of angiogram $I_k$;

$\vec{\phi}$ is a unit vector in the direction of φ;

$\vec{R}D(i,j)$ is a unit vector of the ridge direction of angiogram $I_k$; and $$h(x) = \begin{cases} 1 - |x| & -1 \le x \le 1 \\ 0 & \text{elsewhere} \end{cases} \quad (16)$$

where: $x = \left( \vec{\varphi} \cdot \overrightarrow{RD}(i,j) \right)$. (17)

The calculated ridge cost E(s,t) essentially represents the ridge strength of a translated version of previous polyline contour $[\phi_I^{k-1}]$ with respect to ridge magnitude RM and ridge direction RD for the underlying pixels at the translated location. Successive iterations of set STEPS 208, 209 and 211, translate STEP 212, calculate STEP 213, and decision STEPS 214 and 215 result in obtaining a set of ridge costs E(s,t) with respect to translated versions of previous polyline contour $[\phi_I^{k-1}]$ for all possible translations within a predetermined area of a current angiogram $I_k$. The values of each of the indices s and t, which range between the values –100 and +100, determine the translation distances during each iteration. In store STEP 216, computer 13 stores a predetermined set of best candidates, e.g., a set of the 100 best candidates, of the translated versions of previous polyline contour $[\phi_I^{k-1}]$. The best candidates are those translated previous polyline contours $[\phi_I^{k-1}]$ with the 100 lowest ridge costs E(s,t) calculated in STEP 213.

In general, the 100 best candidates will be clustered in just a few regions in angiogram $I_k$. Thus, computer 13 executes, in cluster STEP 217, a conventional clustering routine with respect to the 100 best candidates to find a cluster-centered candidate with respect to each cluster. The following publication describes a preferred clustering routine for use in cluster STEP 217: Jain et al, "Algorithms for Clustering Data", Prentice Hall, pp. 89–92, 1988 (referred to herein as the Jain et al publication). The clustering routine, executed in cluster STEP 217, typically produces only a few cluster-centered candidates, about one to four. Computer 13 stores the cluster-centered candidates in store STEP 218. Finally, computer 13 returns to input STEP 193 of FIG. 19 via return STEP 219.

In input STEP 193 of FIG. 19, computer 13 inputs initial polyline contour $[\phi_I^1]$. Computer 13 then executes find STEP 194 with respect to initial polyline contour $[\phi_I^1]$ in accordance with the FIG. 20 process described above with respect to find STEP 192. In this instance, however, computer 13 will find the 100 best candidates with respect to translated versions of initial polyline contour $[\phi_I^1]$. These 100 best candidates will also be clustered in angiogram $I_k$. Thus, computer 13 executes cluster STEP 217 to find cluster-centered candidates. The clustering routine, executed in cluster STEP 217, will again produce a few cluster-centered candidates, which computer 13 stores in store STEP 218 along with the previously stored cluster-centered candidates. The total number m of cluster-centered candidates stored at this point will also be small, e.g., between two and eight. Finally, computer 13 stores the number m, representing the total number of cluster-centered candidates, and returns to input STEP 195 (see FIG. 19) via return STEP 219.

In set STEP 195, computer 13 sets index h equal to a value one and then enters search loop 196, which contains STEPS 197–201. Computer 13 executes m successive iterations of search loop 196. Using a different one of the m cluster-centered candidates as a starting point, computer 13 performs an optimal polyline routine (described above with respect to FIG. 5) to search for optimal polyline contour $[\phi_I^h]$, where h=1, 2, . . . , m, in the current angiogram $I_k$. In input STEP 197, computer 13 inputs cluster-centered candidate h as an input polyline contour (see corresponding input STEP 42 in FIG. 5). In initialize STEP 198, computer 13 will initialize a set of search spaces SS and a polyline cost function (see corresponding initialize STEP 43 in FIG. 5). The initialized search spaces SS and polyline cost function are used in search STEP 198 to search for optimal polyline contour $[\phi_I^h]$ using a graph exploration routine as described above with respect to corresponding search STEP 44 in FIGS. 5 and 7. Index h is compared to the value of index m in decision STEP 200, and, if h does not equal m, h is incremented in set STEP 201 and another iteration of search loop 196 is executed with respect to a different one of the cluster-centered candidates. After all m cluster-centered candidates have been processed in m iterations of search loop 196, computer 13 exits the YES path of decision STEP 200, and stores the best optimal polyline contour $[\phi_I^k]$ in store STEP 202, i.e., the best optimal polyline contour $[\phi_I^k]$ is the optimal polyline contours $[\phi_I^h]$ yielding the lowest cost calculated in search STEP 199. At this point, computer 13, in go to STEP 203, returns the process to decision STEP 138 in FIG. 10 for processing the next angiogram $I_k$, if index k is less than K. Computer 13 essentially performs recover STEP 137 (K–1) times to acquire the complete set of optimal polyline contours $[\phi_I^1]$–$[\phi_I^k]$. FIG. 22 contains images 90A–90F (see corresponding images in FIGS. 9A–9F) illustrating a set of six optimal polyline contours $[\phi_I^1]$–$[\phi_I^6]$ superimposed on a common arterial section of artery tree 91. When index k equals K, computer 13 advances to generate STEP 140 to produce a motion compensated sequence of the K images in cineangiogram $[I_k]$.

Figure 21:
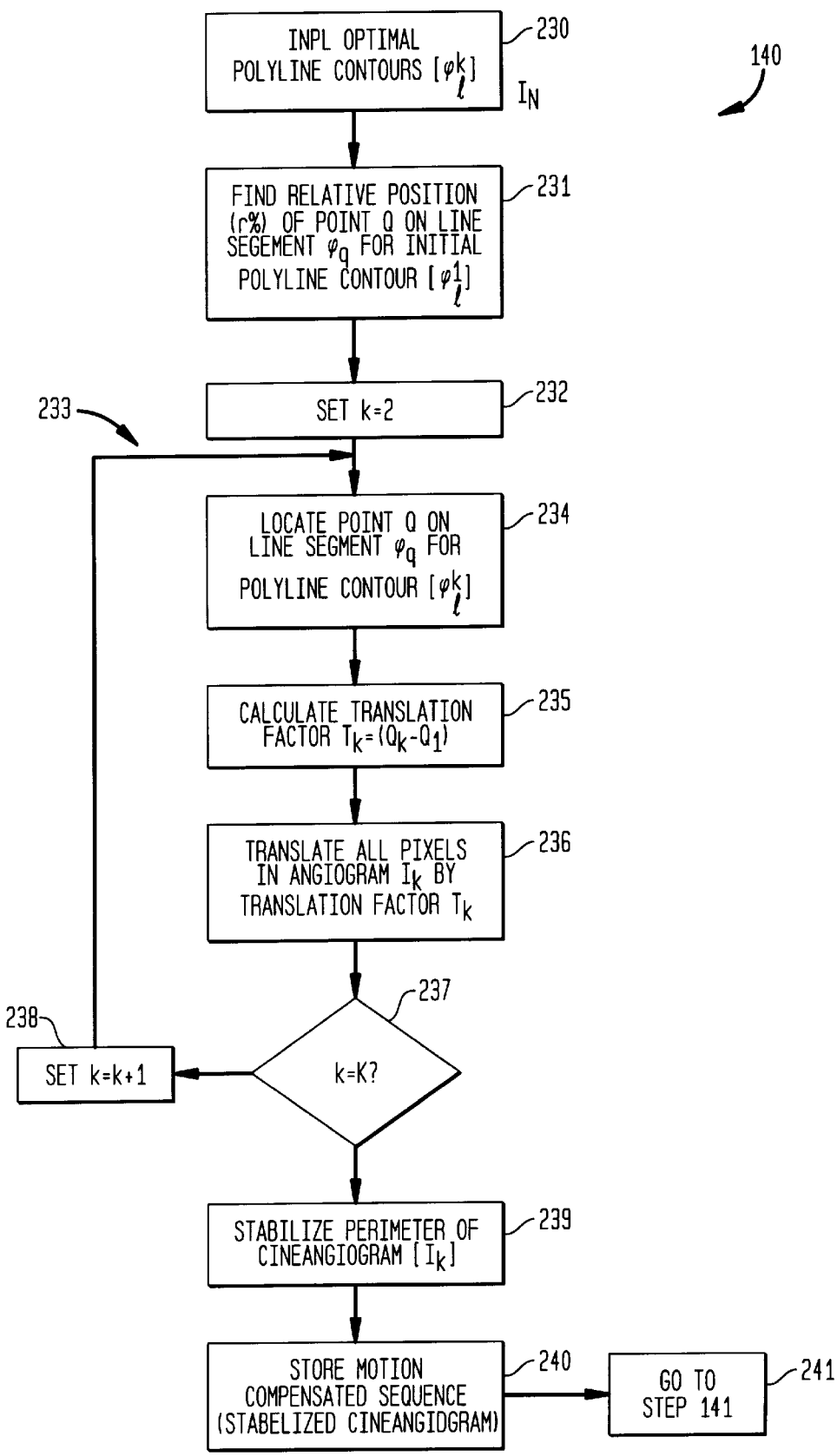
FIG. 21 depicts a high-level flow diagram illustrating still a further portion of the motion compensation method of FIG. 10.
Figure 22A:
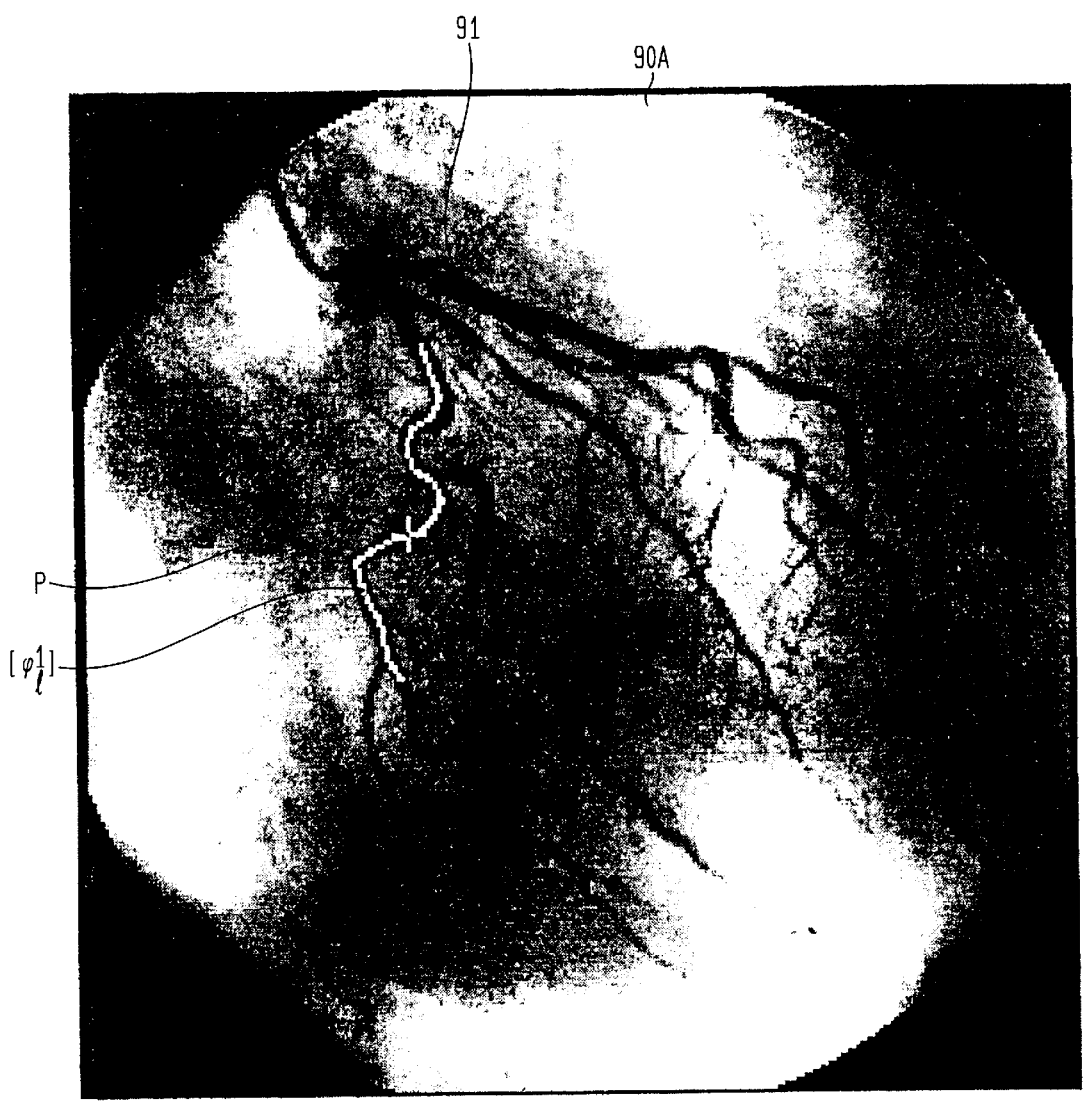
FIGS. 22A–22F contains six angiograms corresponding to those shown in FIGS. 9A–9F, illustrating tracked polyline contours superimposed on a common arterial section.
Figure 22B:
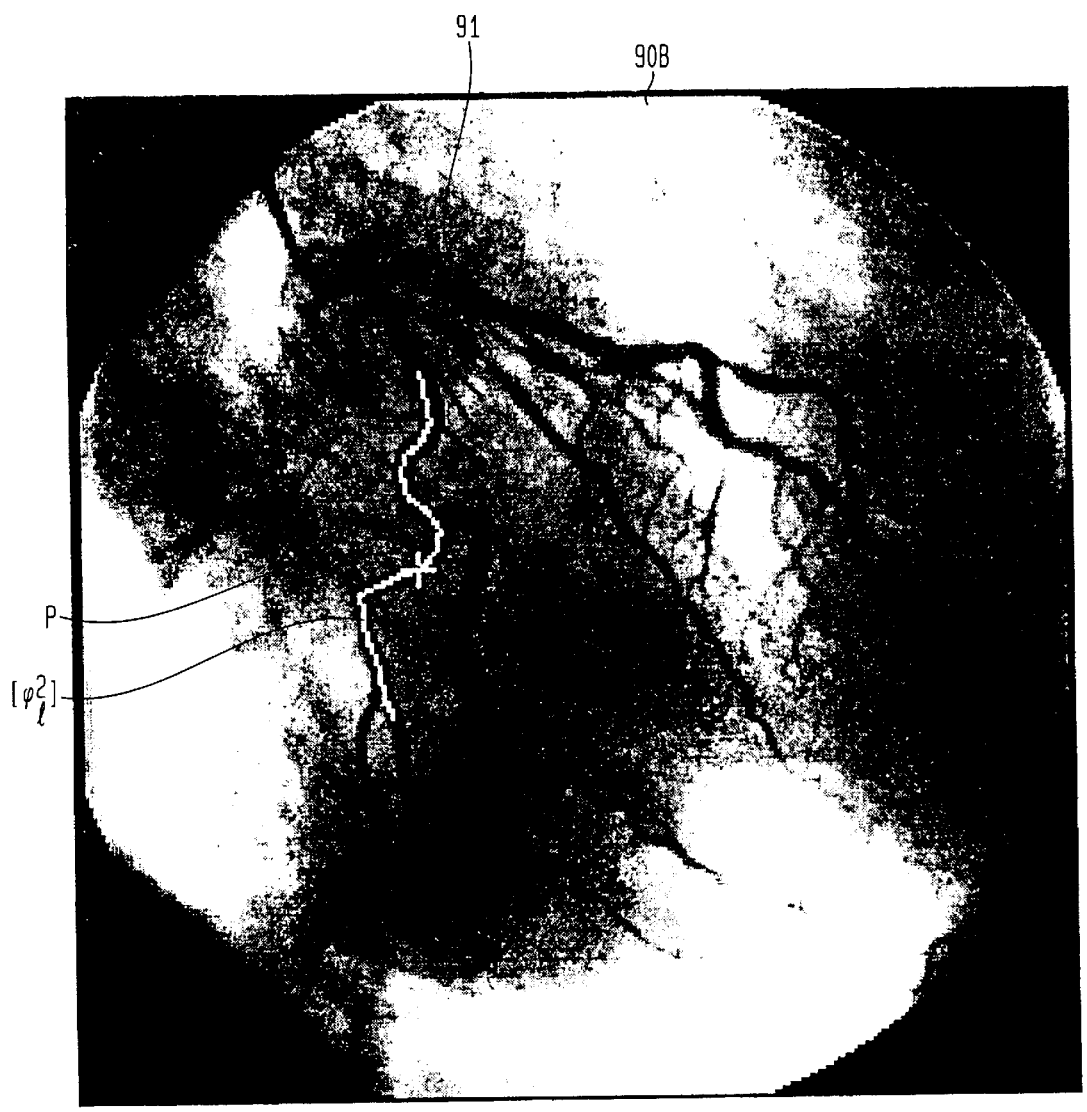
Figure 22C:
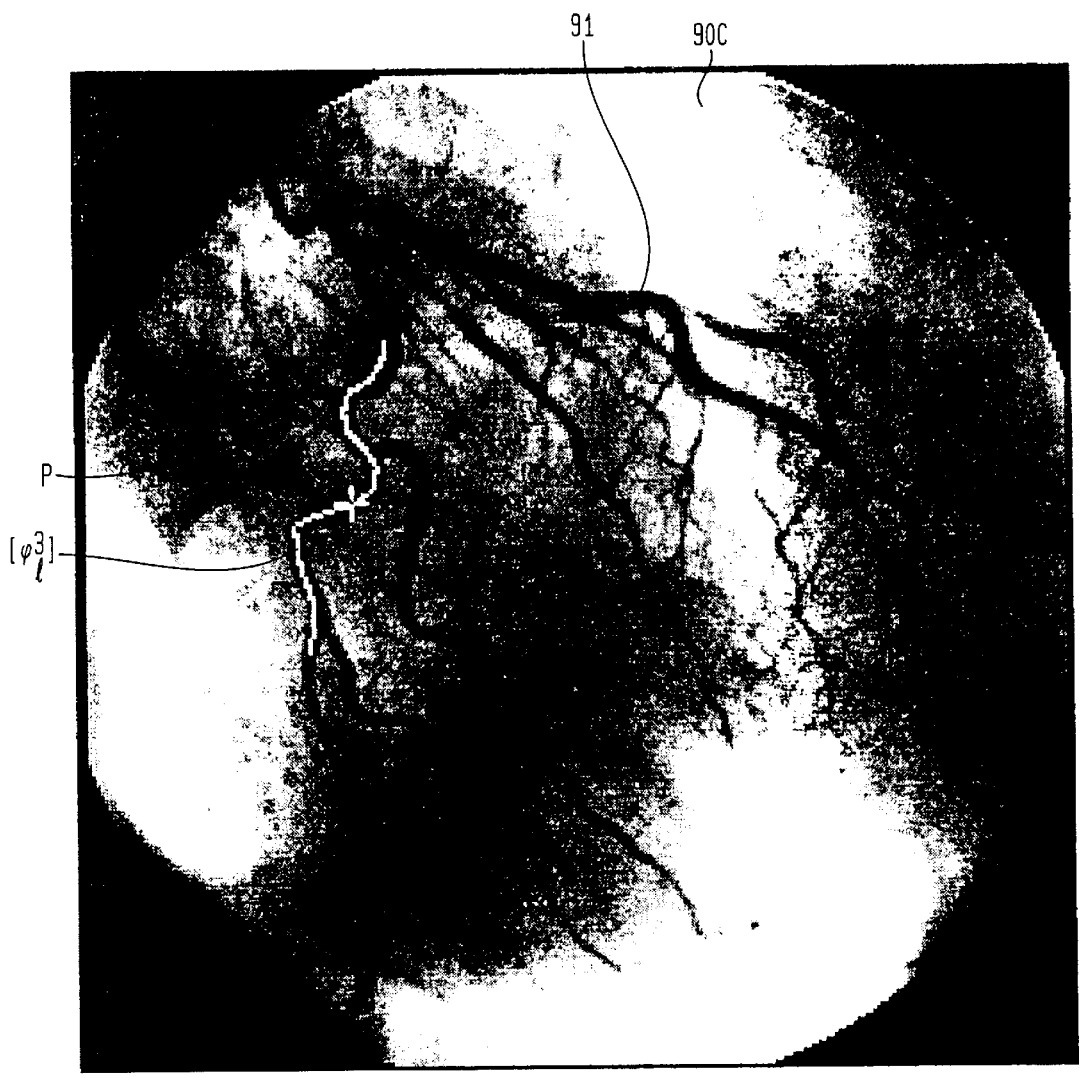
Figure 22D:
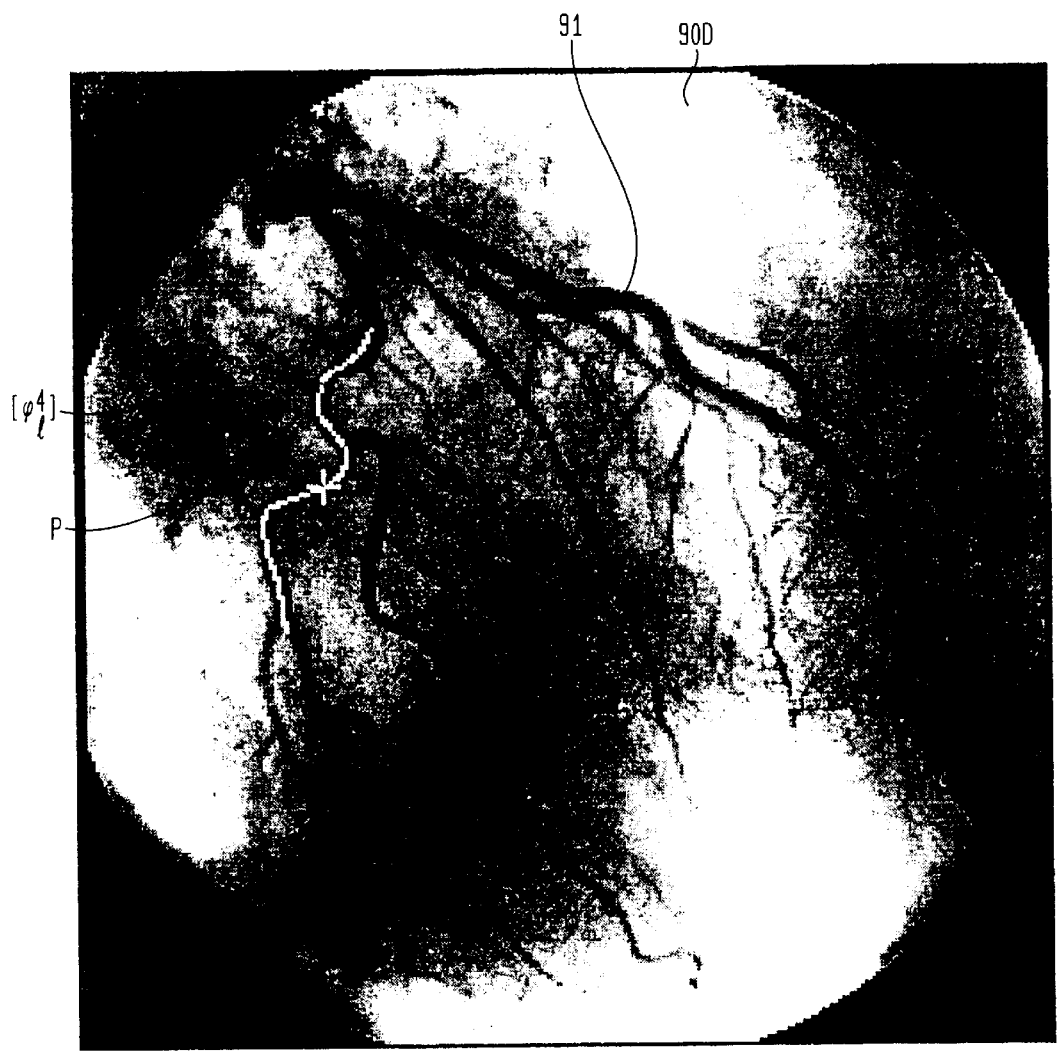
Figure 22E:
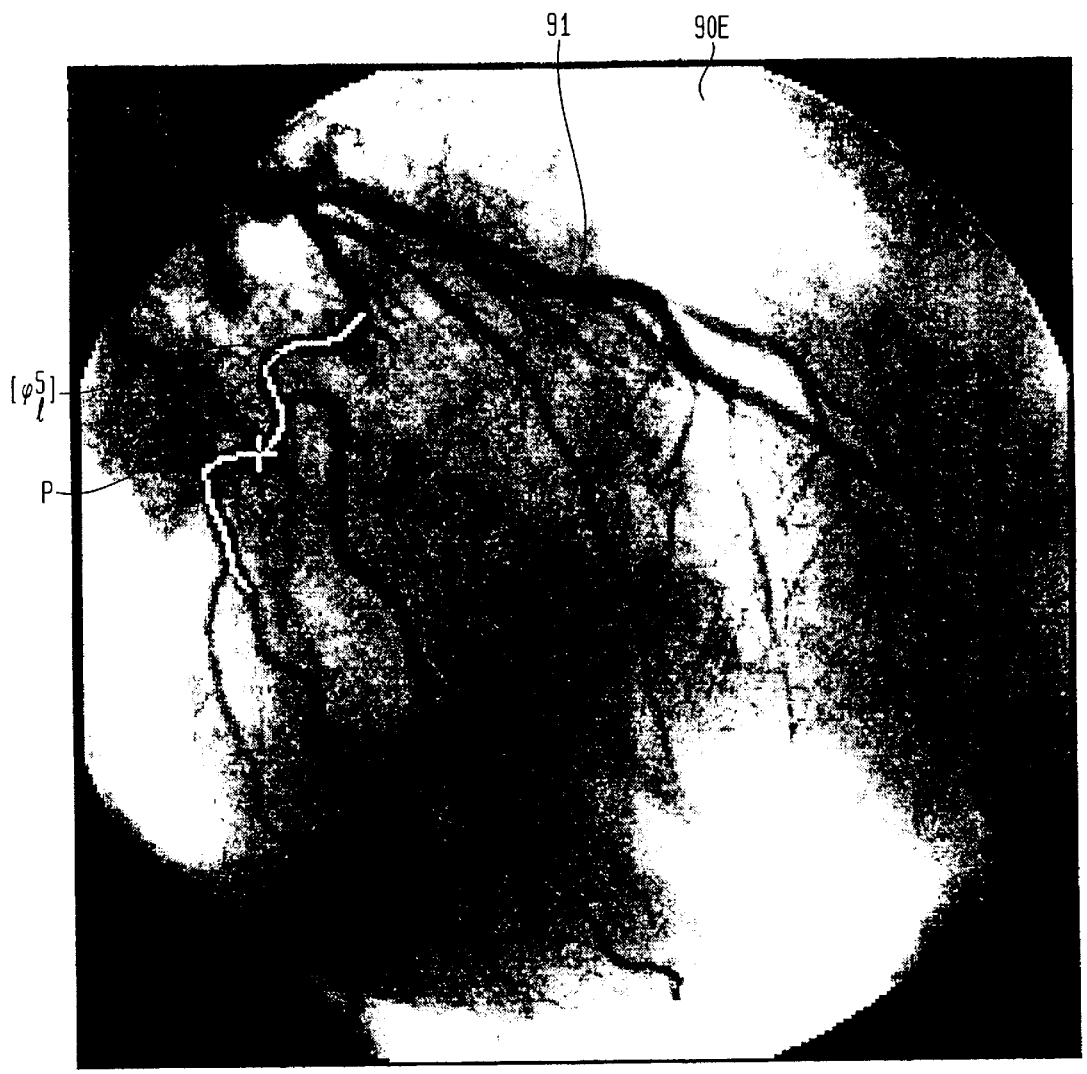
Figure 22F:
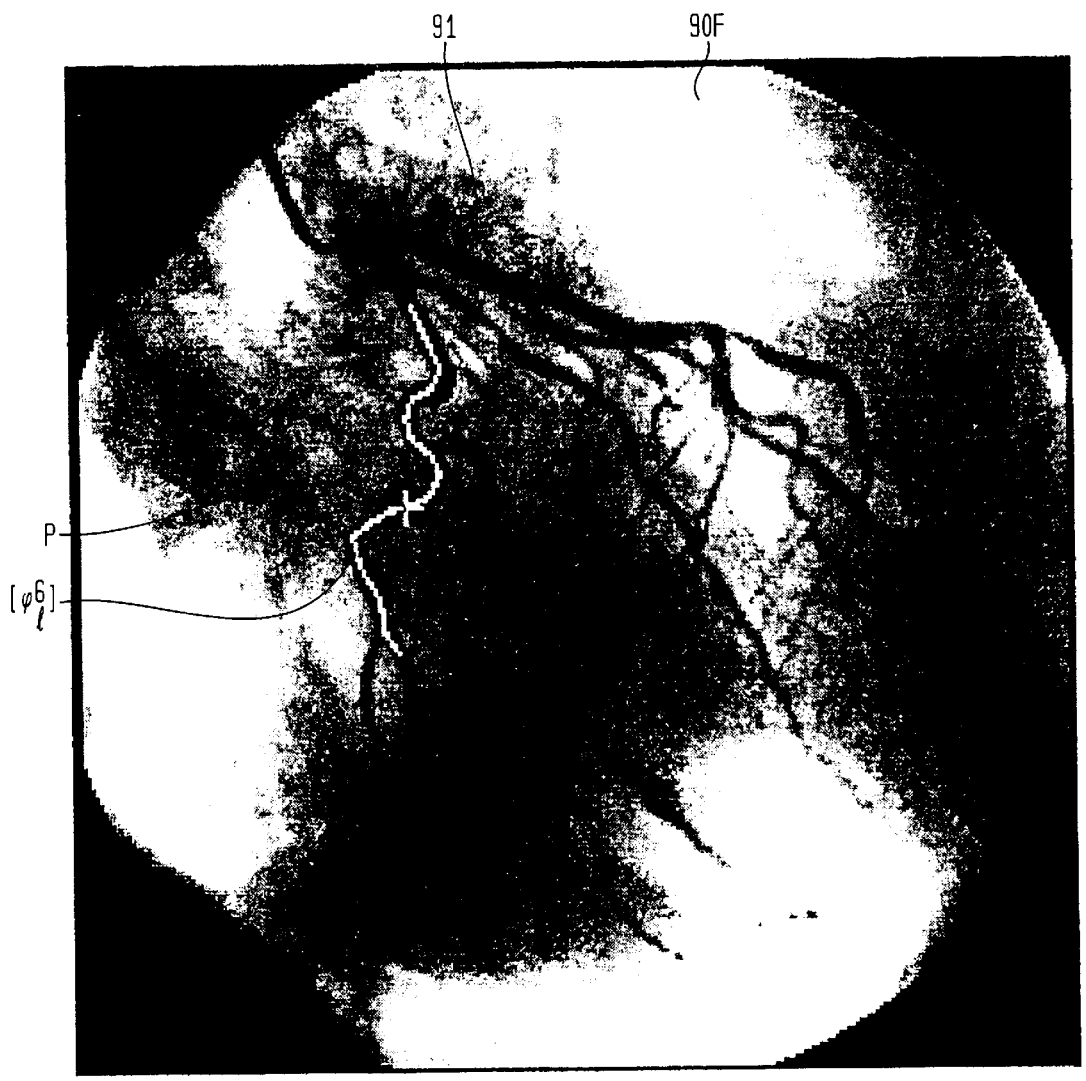

FIG. 21 illustrates a high-level flow diagram of a procedure for generating a motion compensated sequence in generate STEP 140. The motion compensation procedure of FIG. 21, which will be described with reference to initial polyline contour $[\phi_I^1]$ in FIG. 18, begins with input STEP 230 in which computer 13 inputs optimal polyline contour $[\phi_I^k]$ which were saved in store STEP 202 of FIG. 20. Next in find STEP 231, computer 13 calculates the relative position of point Q as a percentage of the distance between vertices D(q) and D(q+1) on initial polyline contour $[\phi_I^1]$. FIG. 18, which depicts this process, shows point Q located on line segment $\phi_q$ and spaced from vertex Dq a distance that is r% of the total distance between vertices D(q) and D(q+1). After setting k equal to a value two in set STEP 232, computer 13 enters image translation loop 233 comprising STEPS 234–238. Starting with the second angiogram $I_2$ in locate STEP 234 and using the value r%, computer 13 locates point Q on line segment $\phi_q$ of polyline contour $[\phi_I^2]$. Specifically, computer 13 spots point Q on line segment $\phi_q$ of the second polyline contour $[\phi_I^2]$ a distance from vertex Dq that is r% of the total distance between vertices D(q) and D(q+1) on polyline contour $[\phi_I^2]$.

Next, computer 13 creates a motion compensated sequence by translating every pixel according to the motion of the point of interest, i.e., the motion of point Q. In calculate STEP 235, computer 13 calculates translation factor $T_k$ by finding the value of $(Q_k-Q_1)$, where $Q_k$ represents the pixel coordinates of point Q in angiogram $I_k$ and $Q_1$ represents the pixel coordinates of point Q in angiogram $I_1$. Consequently, when processing second angiogram $I_2$ in the first iteration of image translation loop 233, translation factor $T_2$ will be set equal to $(Q_2-Q_1)$, i.e., the distance between pixel coordinates $Q_2$ in second angiogram $I_2$ and pixel coordinates $Q_1$ in first angiogram $I_1$. Using the current value of translation factor $T_k$, translate STEP 236 creates a motion compensated angiogram $TI_k$ by effectively translating the image pixels in the current angiogram $I_k$ by an amount equal to the distance between point Q in the first angiogram $I_1$ and point Q in the current angiogram $I_k$. Computer 13 performs subsequent iterations of image translation loop 233, entering each loop via the NO path of decision STEP 237 and set STEP 238. Thus, computer 13 performs (K−1) iterations of image translation loop 233 to process angiograms ($I_2$–$I_K$).

After computer 13 has translated the pixel coordinates of all image points in each angiogram $I_k$, point Q will have the same pixel coordinates (i,j) in each angiogram. Consequently, as a user displays motion compensated cineangiogram [$TI_k$] on monitor 14, point Q will remain motionless. Since all image points experience a common rigid translation, their absolute motion may probably change but their relative motion will remain the same. Thus, local deformations of the arteries remain the same and are still observable. In this regard, the black perimeter of each image 90A–90F in FIGS. 9A–9F has also been translated and, if not adjusted, normally remains stationary during playback, will move or oscillate during playback. To prevent the movement of the black perimeter from distracting a viewer, computer 13 stabilizes the perimeter in stabilize STEP 239 by setting the intensity at each pixel in each image equal to zero (black), if its corresponding pixel has an image intensity of substantially zero in any image. Consequently, all substantially black areas will remain motionless in motion compensated cineangiogram [$TI_k$]. Computer 13 saves the motion compensated cineangiogram [$TI_k$] in store STEP 240. Finally, in go to STEP 241, computer 13 returns the process to decision STEP 141 in FIG. 10.

Figure 23:
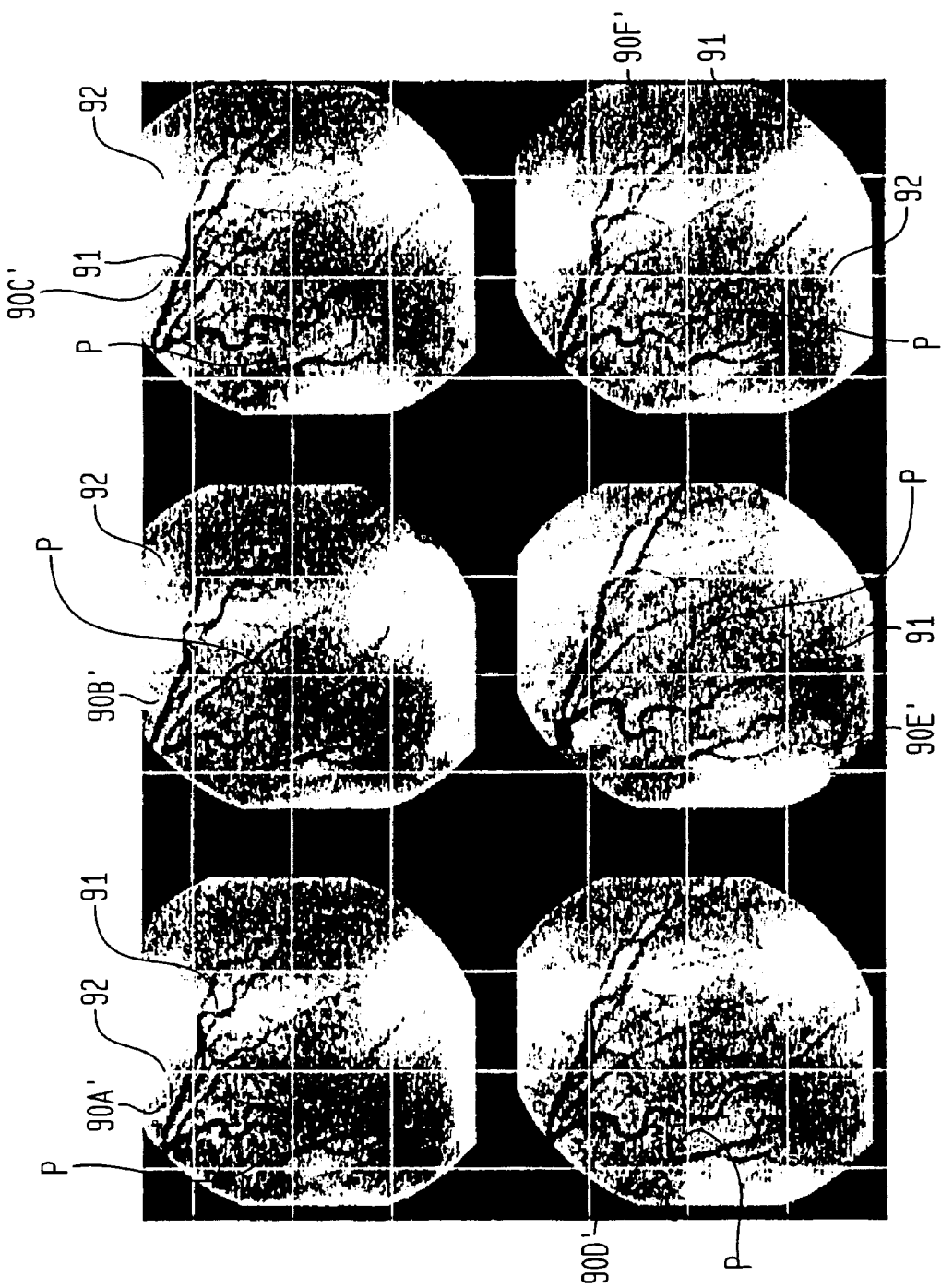
FIG. 23 contains six frames of a motion compensated cineangiogram, corresponding to the frames shown in FIGS. 9A–9F and FIG. 22.

FIGS. 22A–22F show images 90A–90F with a portion of artery tree 91 being tracked with a polyline contour. The example of FIGS. 22A–22F depicts a set of six optimal polyline contours [$\phi_l^1$]–[$\phi_l^6$], where l=1, 2, . . . , L. FIG. 23 contains a set of six images 90A'–90F' of motion compensated cineangiogram [$TI_k$]. Images 90A'–90F' corresponding to respective images 90A–90F in FIGS. 9A–9F and 22A–22F. As can be seen in FIG. 23, point P remains at the same location in all images 90A'–90F' of motion compensated cineangiogram [$TI_k$].

Various other applications of the optimal polyline tracking technique are contemplated and may obviously be resorted to by those skilled in the art. It is therefore to be understood that, within the scope of the appended claims, the invention may be practiced otherwise than as specifically described.

What is claimed is:

1. A method of tracking an object in a sequence of digital images, each said image formed from an array of pixels and having a one-dimensional feature, said method comprising the steps of:
acquiring said sequence of images;
displaying a first one of said images containing said object;
selecting, in said first one of said images, at least one user-selected point on said object of interest adjacent said one-dimensional feature;
finding, in said first one of said images, a feature point located on said one-dimensional feature adjacent said user-selected point;
forming an initial polyline contour substantially outlining said one-dimensional feature in said first one of said images; and
recovering an optimal polyline contour in each of the other of said images, each said optimal polyline contour outlining said one-dimensional feature and including said feature point.

2. The method of claim 1 further including locating a set of pixels outlining said one-dimensional feature in said first one of said images, said set of pixels including said feature point.

3. The method of claim 2 wherein said step of forming an initial polyline contour includes designating spaced pixels in said set of pixels as vertices of said initial polyline contour to outline said one-dimensional feature in said first one of said images.

4. The method of claim 3 wherein said step of locating a set of pixels includes searching a plurality of pixels in a space enveloping said feature point and a portion of said object for pixels exhibiting an abrupt change in the intensity of said image.

5. The method of claim 4 wherein said step of searching a plurality of pixels includes searching pixels located on an edge of said object.

6. The method of claim 4 wherein said step of searching a plurality of pixels includes searching pixels located on a ridge of said object.

7. The method of claim 6 wherein said step of searching pixels located on a ridge of said object includes calculating the pixel cost of said pixels in said space enveloping said feature point and said portion of said object in accordance with the following equation:

$$Z(i, j) = Z(u, v) + \frac{1}{RM(i, j) + \varepsilon} + |RD(u, v) - RD(i, j)|$$

where:
$Z(i,j)$ is the pixel cost of a current pixel, having pixel coordinates i and j, with respect to a corresponding previous pixel having pixel coordinates u and v;
$Z(u,v)$ is the pixel cost of said previous pixel;
$RM(i,j)$ is the ridge magnitude of said current pixel;
$\varepsilon$ is an arbitrarily small positive number;
$RD(i,j)$ is the ridge direction of said current pixel; and
$RD(u,v)$ is the ridge direction of said previous pixel.

8. The method of claim 4 wherein said step of recovering an optimal polyline contour in each of said other of said images includes searching a predetermined area of each said other of said images for contour candidates, and performing a graph exploration procedure with respect to said contour candidates, said initial polyline contour and said optimal polyline contour in a previous one of said images.

9. The method of claim 8 wherein said step of searching a predetermined area of each said other of said images for contour candidates includes calculating a ridge cost of said contour candidates in accordance with the following equation:

$$E(s, t) = \sum_{l=1}^{L} \frac{1}{U(\varphi) + \varepsilon}$$

where:

$$U(\varphi) = \frac{\sum_{(i,j) \in \varphi} \left[ RM(i, j) h\left(\vec{\varphi} \cdot \vec{RD}(i, j)\right) \right]}{\sum_{(i,j) \in \varphi} 1};$$

$E(s,t)$ is said ridge cost;
$\phi$ is a line segment of said contour candidates;
$\varepsilon$ is an arbitrarily small positive number;
$RM(i,j)$ is the ridge magnitude of said images;

$\vec{\varphi}$ is a unit vector in the direction of φ;

$\vec{RD}(i,j)$ is a unit vector of the ridge direction of said images; and $$h(x) = \begin{cases} 1 - |x| & -1 \leq x \leq 1 \\ 0 & \text{elsewhere} \end{cases}$$

where: $x = \left(\vec{\varphi} \cdot \vec{RD}(i,j)\right)$.

10. A method of producing a stabilized display of a sequence of digital images each image formed from an array of pixels, said display being stabilized about a fixed point in said sequence of images, said method comprising the steps of:

displaying one of said images of said sequence of images;

selecting a user-selected point from said one of said images, said user-selected point being located on a moving object having a one-dimensional feature;

extracting an initial polyline contour from said one of said images, said initial polyline contour outlining said one-dimensional feature in the neighborhood of said user-selected point;

recovering from each of the other of said images of said sequence of images an optimal polyline contour corresponding to said initial polyline contour;

locating said fixed point adjacent said user-selected point on said initial polyline contour, and locating said fixed point on each of said optimal polyline contours; and forming said stabilized display by digitally translating the position of said each of said other of said images such that said fixed point appears substantially motionless in said stabilized display.

11. The method of claim 10 wherein said step of extracting an initial polyline contour includes locating a set of pixels outlining said one-dimensional feature in said one of said images, said set of pixels including said fixed point.

12. The method of claim 11 wherein said step of extracting an initial polyline contour includes designating spaced pixels in said set of pixels as vertices of said initial polyline contour to outline said one-dimensional feature in said one of said images.

13. The method of claim 12 wherein said step of locating a set of pixels includes searching a plurality of pixels in a space enveloping said fixed point and a portion of said object for pixels exhibiting an abrupt change in the intensity of said image.

14. The method of claim 13 wherein said step of searching a plurality of pixels includes searching pixels located on a ridge of said object.

15. The method of claim 14 wherein said sequence of images is a cineangiogram and said step of searching pixels located on a ridge of said object includes locating a ridge on an arterial section.

16. The method of claim 15 wherein said step of locating a ridge on an arterial section includes calculating the pixel cost of said pixels in said space enveloping said feature point and a portion of said ridge on said arterial section in accordance with the following equation:

$$Z(i,j) = Z(u,v) + \frac{1}{RM(i,j) + \varepsilon} + |RD(u,v) - RD(i,j)|$$

where:

Z(i,j) is the pixel cost of a current pixel, having pixel coordinates i and j, with respect to a corresponding previous pixel having pixel coordinates u and v;

Z(u,v) is the pixel cost of said previous pixel;

RM(i,j) is the ridge magnitude of said current pixel;

ε is an arbitrarily small positive number;

RD(i,j) is the ridge direction of said current pixel; and

RD(u,v) is the ridge direction of said previous pixel.

17. The method of claim 13 wherein said step of recovering an optimal polyline contour in each of said other of said images includes searching a predetermined area of each said other of said images for contour candidates, and performing a graph exploration procedure with respect to said contour candidates, said initial polyline contour and said optimal polyline contour in a previous one of said images.

18. The method of claim 17 wherein said step of searching a predetermined area of each said other of said images for contour candidates includes calculating the ridge cost of said contour candidates in accordance with the following equation:

$$E(s,t) = \sum_{l=1}^{L} \frac{1}{U(\varphi) + \varepsilon}$$

where:

$$U(\varphi) = \frac{\sum_{(i,j) \in \varphi} \left[RM(i,j)h\left(\vec{\varphi} \cdot \vec{RD}(i,j)\right)\right]}{\sum_{(i,j) \in \varphi} 1};$$

E(s,t) is said ridge cost;

φ is a line segment of said contour candidates;

ε is an arbitrarily small positive number;

RM(i,j) is the ridge magnitude of said images;

$\vec{\varphi}$ is a unit vector in the direction of φ;

$\vec{RD}(i,j)$ is a unit vector of the ridge direction of said images; and $$h(x) = \begin{cases} 1 - |x| & -1 \leq x \leq 1 \\ 0 & \text{elsewhere} \end{cases}$$

where: $x = \left(\vec{\varphi} \cdot \vec{RD}(i,j)\right)$.

19. An image tracking system comprising:

image means for acquiring a sequence of digital images, each said image formed from an array of pixels and containing an object having a one-dimensional feature;

display means for displaying a first one of said images containing said object;

select means for selecting, in said first one of said images, at least one user-selected point on said object of interest adjacent said one-dimensional feature;

feature point means for finding, in said first one of said images, a feature point located on said one-dimensional feature adjacent said user-selected point;

initial polyline contour means for forming an initial polyline contour substantially outlining said one-dimensional feature in said first one of said images; and recover means for recovering an optimal polyline contour in each of the other of said images, each said optimal polyline contour outlining said one-dimensional feature and including said feature point.

20. The system of claim 19 wherein said one-dimensional feature is a ridge, and further including ridge contour means for locating a set of pixels outlining said ridge, including said feature point located on said ridge, in said first one of said images.

21. The system of claim 20 wherein said initial polyline contour means includes vertex means for designating spaced pixels in said set of pixels as vertices of said initial polyline contour to outline said ridge in said first one of said images.

22. The system of claim 21 wherein said ridge contour means includes calculation means for calculating the pixel cost of a plurality of said pixels in a space enveloping said feature point and a portion of said ridge in accordance with the following equation:

$$Z(i, j) = Z(u, v) + \frac{1}{RM(i, j) + \varepsilon} + |RD(u, v) - RD(i, j)|$$

where:

$Z(i,j)$ is the pixel cost of a current pixel, having pixel coordinates i and j, with respect to a corresponding previous pixel having pixel coordinates u and v;

$Z(u,v)$ is the pixel cost of said previous pixel;

$RM(i,j)$ is the ridge magnitude of said current pixel;

$\varepsilon$ is an arbitrarily small positive number;

$RD(i,j)$ is the ridge direction of said current pixel; and $RD(u,v)$ is the ridge direction of said previous pixel.

23. The system of claim 22 wherein said recover means includes means for searching a predetermined area of each said other of said images for contour candidates, means for performing a graph exploration procedure with respect to said contour candidates, said initial polyline contour and said optimal polyline contour in a previous one of said images, and means for calculating a ridge cost of said contour candidates in accordance with the following equation:

$$E(s, t) = \sum_{l=1}^{L} \frac{1}{U(\varphi) + \varepsilon}$$

where:

$$U(\varphi) = \frac{\sum_{(i,j)\in\varphi} \left[RM(i, j)h\left(\vec{\varphi} \cdot \vec{RD}(i, j)\right)\right]}{\sum_{(i,j)\in\varphi} 1};$$

$E(s,t)$ is said ridge cost;

$\varphi$ is a line segment of said contour candidates;

$\varepsilon$ is an arbitrarily small positive number;

$RM(i,j)$ is the ridge magnitude of said images;

$\vec{\varphi}$ is a unit vector in the direction of $\varphi$;

$\vec{RD}(i,j)$ is a unit vector of the ridge direction of said images; and $$h(x) = \begin{cases} 1 - |x| & -1 \leq x \leq 1 \\ 0 & \text{elsewhere} \end{cases}$$

where: $x = \left(\vec{\varphi} \cdot \vec{RD}(i, j)\right)$.

24. A motion compensation system for producing a stabilized display of a sequence of digital images, wherein each said image is formed from an array of pixels, and said display is stabilized about a fixed point in said sequence of images comprising:

display means for displaying one of said images of said sequence of images;

select means for selecting a user-selected point from said one of said images, said user-selected point being located on a moving object having a one-dimensional feature;

initial polyline contour means for extracting an initial polyline contour from said one of said images, said initial polyline contour outlining said one-dimensional feature in the neighborhood of said user-selected point;

recover means for recovering from each of the other of said images of said sequence of images an optimal polyline contour corresponding to said initial polyline contour;

means for locating said fixed point adjacent said user-selected point on said initial polyline contour, and locating said fixed point on each of said optimal polyline contours; and translate means for forming said stabilized display by digitally translating the position of said each of said other of said images such that said fixed point appears substantially motionless in said stabilized display.

25. The system of claim 24 wherein said initial polyline contour means includes means for locating a set of pixels outlining said one-dimensional feature in said one of said images, said set of pixels including said fixed point.

26. The system of claim 25 wherein said initial polyline contour means includes vertex means for designating spaced pixels in said set of pixels as vertices of said initial polyline contour to outline said one-dimensional feature in said one of said images.

27. The system of claim 26 wherein said means for locating a set of pixels includes means for locating said set of pixel, on a ridge of said object, and wherein said sequence of images is a cineangiogram and said set of pixels are located on a ridge of an arterial section.

28. The system of claim 27 wherein said initial polyline contour means includes means for calculating the pixel cost of said pixels in said space enveloping said feature point and a portion of said ridge on said arterial section in accordance with the following equation:

$$Z(i, j) = Z(u, v) + \frac{1}{RM(i, j) + \varepsilon} + |RD(u, v) - RD(i, j)|$$

where:

$Z(i,j)$ is the pixel cost of a current pixel, having pixel coordinates i and j, with respect to a corresponding previous pixel having pixel coordinates u and v;

$Z(u,v)$ is the pixel cost of said previous pixel;

$RM(i,j)$ is the ridge magnitude of said current pixel;

$\varepsilon$ is an arbitrarily small positive number;

$RD(i,j)$ is the ridge direction of said current pixel; and $RD(u,v)$ is the ridge direction of said previous pixel.

29. The system of claim 28 wherein said recover means includes means for searching a predetermined area of each said other of said images for contour candidates, means for performing a graph exploration procedure with respect to said contour candidates, said initial polyline contour and said optimal polyline contour in a previous one of said images, and means for calculating the ridge cost of said contour candidates in accordance with the following equation:

$$E(s,t) = \sum_{l=1}^{L} \frac{1}{U(\varphi) + \varepsilon}$$

where:

$$U(\varphi) = \frac{\sum_{(i,j) \in \varphi} \left[ RM(i,j) h\left(\vec{\varphi} \cdot \vec{RD}(i,j)\right) \right]}{\sum_{(i,j) \in \varphi} 1};$$

E(s,t) is said ridge cost;
φ is a line segment of said contour candidates;
ε is an arbitrarily small positive number;

RM(i,j) is the ridge magnitude of said images;
$\vec{\varphi}$ is a unit vector in the direction of φ;
$\vec{RD}(i,j)$ is a unit vector of the ridge direction of said images; and $$h(x) = \begin{cases} 1 - |x| & -1 \leq x \leq 1 \\ 0 & \text{elsewhere} \end{cases}$$

where: $x = \left(\vec{\varphi} \cdot \vec{RD}(i,j)\right)$.

* * * * *